United States Patent
Akolkar et al.

(10) Patent No.: US 9,122,745 B2
(45) Date of Patent: Sep. 1, 2015

(54) INTERACTIVE ACQUISITION OF REMOTE SERVICES

(71) Applicant: International Business Machines Corporation, Armonk, NY (US)

(72) Inventors: Rahul P. Akolkar, Tuckahoe, NY (US);
Thomas E. Chefalas, Somers, NY (US);
Yexi Jiang, Miami, FL (US); Jim A. Laredo, Katonah, NY (US);
Chang-Shing Perng, Goldens Bridge, NY (US); Anca Sailer, Scarsdale, NY (US); Frank A. Schaffa, Hartsdale, NY (US); Alla Segal, Mount Kisco, NY (US); Ignacio Silva-Lepe, Putnam Valley, NY (US); Tao Tao, Hawthorne, NY (US); Yang Zhou, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

(21) Appl. No.: 13/890,969

(22) Filed: May 9, 2013

(65) Prior Publication Data
US 2014/0337010 A1 Nov. 13, 2014

(51) Int. Cl.
*G06F 17/27* (2006.01)
*G06F 17/20* (2006.01)
*G06F 17/30* (2006.01)

(52) U.S. Cl.
CPC ................ *G06F 17/30654* (2013.01)

(58) Field of Classification Search
CPC ..... G10L 15/22; G10L 15/1815; G10L 15/26; G06F 3/167; G06F 17/28; G06F 30/0611; G06F 17/30401; G06F 17/30424; G06F 17/3043; G06F 17/30522

USPC .......... 704/1, 9; 705/26.1, 26.4; 707/E17.073
See application file for complete search history.

(56) References Cited

U.S. PATENT DOCUMENTS

| | | | |
|---|---|---|---|
| 5,872,850 | A | 2/1999 | Klein |
| 7,555,426 | B2 | 6/2009 | Wang |
| 7,822,699 | B2 | 10/2010 | Katariya |
| 8,117,196 | B2 | 2/2012 | Jones |

(Continued)

OTHER PUBLICATIONS

"HP Cloud Services". downloaded from https://www.hpcloud.com/ on Apr. 12, 2013.

(Continued)

*Primary Examiner* — Charlotte M Baker
(74) *Attorney, Agent, or Firm* — Louis J. Percello; Otterstedt, Ellenbogen & Kammer, LLP

(57) ABSTRACT

A natural language specification of at least one high level information technology services requirement is obtained from a user, via a conversational interface; the same is parsed into first pre-defined semi-structured data, using a conversation parser. Based on the first pre-defined semi-structured data, a subset of candidate information technology services is identified, with a dialog engine, from a plurality of candidate information technology services provided by a plurality of vendors, the dialog engine is used to formulate a response including second pre-defined semi-structured data. The response is reverse-parsed into a natural language response, using the conversation parser. The natural language response includes a question for the user to assist in further refining the subset of candidate information technology services; the natural language response is presented to the user via the conversational interface.

20 Claims, 18 Drawing Sheets

(56) References Cited

U.S. PATENT DOCUMENTS

2002/0099533 A1\* 7/2002 Jaqua .............................. 704/1
2006/0161513 A1 7/2006 Drumm
2011/0250872 A1 10/2011 Kim

OTHER PUBLICATIONS

"AWS Marketplace: Find and Buy Server Software and Services that Run on the AWS Cloud". downloaded from https://aws.amazon.com/marketplace on Apr. 12, 2013.
Peter Mell, et al., "The NIST Definition of Cloud Computing" National Institute of Standards and Technologies, Inc. Version 15, Oct. 7, 2009.
Rong N. Chang, "Cloud Provisioning Accelerator". U.S. Appl. No. 13/306,506, filed Nov. 29, 2011.
Alexei Karve, "On-Demand Cloud Service Management". U.S. Appl. No. 13/716,081, filed Dec. 14, 2012.
Alexander Kotov and Chengxiang Zhai. Towards Natural Question—Guided Search. WWW, 2010.
Christina Unger, Lorenz Buhrnann, Jens Lehmann, Axel-Cyrille Ngonga Ngomo, Daniel Gerber and Philipp Cimiano. Template-based Question Answering over RDF Data, WWW, 2012.
Alexander Kotov and Chengxiang Zhai. Interactive Sense Feedback for Difficult Queries. CIKM, 2011.
Makoto Iwayama. Relevance feedback with a small number of relevance judgments: Incremental relevance feedback vs. document clustering. SIGIR, 2000.
Bin Tan, Atulya Velivelli, Hui Fang and Chengxiang Zhai. Term feedback for information retrieval with language models. SIGIR, 2007.
Jens Lehmann and Lorenz Buhmann. AutoSPARQL: Let Users Query Your Knowledge Base. ESWC, 2011.
Vanessa Lopez, Victoria Uren, Enrico Motta and Michele Pasin. AquaLog: An ontology driven question answering system for organizational semantic intranets. 2007 Elsevier B.V.
Alexander Kotov and Chengxiang Zhai. Tapping into Knowledge Base for Concept Feedback: Leveraging ConceptNet to Improve Search Results for Difficult Queries. WSDM, 2012.
Rahul Akolkar, Tom Chefalas, Jim Laredo, Chang-Shing Perng, Anca Sailer, Frank Schaffa, Ignacio Silva-Lepe, and Tao Tao. The future of service marketplaces in the cloud. In IEEE Eight World Congress on Services, 2012.
Steve Battle, Abraham Bernstein, Harold Boley, Benjamin Grosof, Michael Gruninger, Richard Hull, michael Kifer, David Martin, Sheila Mcilraith, Deborah McGuinness, Jianwen Su, and Said Tabet. Semantic web services language, 2005. http://www.w3.org/Submission/SWSF-SWSL.
WordNet, downloaded from http://en.wikipedia.org/wiki/WordNet on May 3, 2013.
Jiewen Huang, Daniel Abadi, and Kun Ren. Scalable sparql query over large rdf graph. In VLDB, 2011.
Makoto Iwayama. Relevance feedback with a small number of relevance judgments: Incremental relevance feedback vs. document clustering. In SIGIR, 2000.
Diane Kelly and Xin Fu. Elicitation of term relevance feedback: An investigation of term source and context. In SIGIR, 2006.
OWL Web Ontology Language. http://www.w3.org/2007/OWL/wiki/OWL Working Group, Apr. 14, 2013.
Freddy Lcu and Alain Lger. A formal model for semantic web service composition. In ISWC, 2006.
Shuang Liu, Fang Liu, Clement Yu, and Yiwei Meng. An effective approach to document retrieval via utilizing wordnet and recognizing phrases. In SIGIR, 2012.
George Miller. Wordnet: A lexical database for english. Communications of ACM, 1995.
Thomas Newmann and Gerhard Weikum. rdf-3x: A rsic-style engine rdf. In VLDB, 2008.
IBM Smart Cloud Enterprise Plus. http://ibmcloud.itosolutions.net, Apr. 14, 2013.
Resource Description Framework (RDF). http://www.w3.org/RDF/, Apr. 14, 2013.
Dumitru Roman, Uwe Keller, Holger Lausen, Jos de Bruijn, Rubn Lara, Michael Stollberg, Axel Polleres, Cristina Feier, Christoph Bussler, and Dieter Fensel. Web service modeling ontology. In Applied Ontology, 2005.
Abraham Sebastian, Natalya Fridman Noy, Tania Tudorache, and Mark Musen. A generic ontology for collaborative ontology development workflows. In Knowledge Engineering and Knowledge Management, 2008.
Peter Pin shan Chen. The entity-relationship model: towards a unified view of data. ACM Transactions on Database System, 1976.
Amazon Web Services. http://aws.amazon.com, Apr. 14, 2013.
Distributed Hash Table. http://en.wikipedia.org/wiki/Distributed hash table, Apr. 14, 2013.
"Why Apigee?" downloaded from http://apigee.com/about/ on May 7, 2013.
"Programmable Web", downloaded from http://www.programmableweb.com/ on May 7, 2013.

\* cited by examiner

```
SELECT DISTINCT  ?entity, ?type WHERE {
{?entity csms:hasWNTag var_1 .  ?entity  rdf:type ?type
}
UNION
. . .
UNION
{?entity csms:hasWNTag var_n .  ?entity rdf:type ?type
} FILTER (?type = csm:ServiceFunction) }
```

*Fig. 10*

Algorithm 1 add

1. Input: new configuration *config*.
2. *unionedCfg = tbl$_{category}$.find(config.categoryID)*
3. if *unionedCfg* does not exists then
4.     *newUnionedCfg = config*
5.     *tbl$_{category}$ = tbl$_{category}$* ∪ *newUnionedCfg*
6. end if
7. if *config* is type 'ConfigNumeric' then
8.     *unionedCfg.min = min(unionedCfg.min, config.min)*
9.     *unionedCFG.max = max(unionedCfg.max, config.max)*
10. else if *config* is type 'ConfigGroup' then
11.     *unionedCfg.options* ∪= *config.options*
12. *End if*
13. Append *config* to list *tbl$_{config}$ [config.categoryID]*

Fig. 13

Algorithm 2 genNext

1. Input: *prevCfgCateID, answer*
2. Output: The ID of 'ConfigCategory' used for generating next question.
3. Record the answer and mark *prevCfgCateID as used,*
4. Remove entries of *prevCfgCateID* from two hash tables.
5. for all *(categoryID, list(config))* pair in $tbl_{config}$ do
6.    Remove unsatisfied *config* from each list of $tbl_{config}$.
7. end for
8. if $tbl_{config}$ is empty then
9.    return Null
10. end if
11. for all *(categoryID, unionedCfg)* pair in $tbl_{category}$ do
12.    Calculate effectiveness based on Formula (2) and (3).
13.    Remove the pair if effectiveness is 0.
14. end for
15. return *categoryID* with highest effectiveness.

*Fig. 14*

| No. | Initial Input | # Category Candidates | # Service Candidates | # Iterations | AVG RESP Time |
|---|---|---|---|---|---|
| 1 | I need an enterprise level virtual infrastructure. | Virtual Desktop, Virtual Infrastructure, Transportation, Project Management | 6 | 3 | 271ms |
| 2 | I want to pay my employees. | Payroll, Payment | 57 | 5 | 305ms |
| 3 | I want to host a mobile game. | Search, Games, Politics, Education | 191 | 9 | 375ms |
| 4 | Show me the services that allows me to store data in cloud. | Backup and recovery, Storage, Transportation, News, Job Search | 53 | 5 | 351ms |
| 5 | I want to arrange a company event. | Events, Music, Travel, Government, Calendar | 148 | 8 | 409ms |
| 6 | I need nothing. | No service category matching your requirement is found. | N/A | N/A | 1189ms |

Fig. 17

INTERACTIVE ACQUISITION OF REMOTE SERVICES

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to cloud computing and the like.

BACKGROUND OF THE INVENTION

The development of virtualization technology has triggered the emergence of cloud services. Over the past several years, an increasing number of service vendors have migrated their traditional information technology (IT) services to the cloud. Due to their flexibility, convenience, and low cost, cloud services have gradually become a high priority for enterprise customers.

SUMMARY OF THE INVENTION

Principles of the invention provide techniques for interactive acquisition of remote services. In one aspect, an exemplary method includes the steps of obtaining from a user, via a conversational interface, a natural language specification of at least one high level information technology services requirement; and parsing the natural language specification of the at least one high level information technology services requirement into first pre-defined semi-structured data, using a conversation parser. Further steps include, based on the first pre-defined semi-structured data, identifying, with a dialog engine, a subset of candidate information technology services from a plurality of candidate information technology services provided by a plurality of vendors; and formulating, with the dialog engine, a response comprising second pre-defined semi-structured data. An even further step includes reverse parsing the response comprising the second pre-defined semi-structured data into a natural language response, using the conversation parser. The natural language response includes a question for the user to assist in further refining the subset of candidate information technology services. An even further step includes causing the natural language response to be presented to the user via the conversational interface.

In another aspect, an exemplary system includes a memory; at least one processor, coupled to the memory; and a computer-readable storage medium. A plurality of distinct software modules are embodied on the computer-readable storage medium. The distinct software modules are loadable into the memory for execution by the processor. The distinct software modules include a conversational interface module, a conversation parser module, and a dialog engine module. The at least one processor is operative to create a conversational interface by executing the conversational interface module. The conversational interface obtains from a user a natural language specification of at least one high level information technology services requirement. The at least one processor is further operative to create a conversation parser by executing the conversation parser module. The conversation parser parses the natural language specification of the at least one high level information technology services requirement into first pre-defined semi-structured data. The at least one processor is still further operative to create a dialog engine by executing the dialog engine module. The dialog engine, based on the first pre-defined semi-structured data, identifies a subset of candidate information technology services from a plurality of candidate information technology services provided by a plurality of vendors; and formulates a response comprising second pre-defined semi-structured data. The conversation parser reverse parses the response comprising the second pre-defined semi-structured data into a natural language response. The natural language response comprises a question for the user to assist in further refining the subset of candidate information technology services. The conversational interface causes the natural language response to be presented to the user.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

ability to handle more complex search requirements than can be handled via traditional keyword-based searching;

ability to handle automatic service configuration based on complex service requirements as opposed to traditional manual service configuration.

These and other features and advantages of the present invention will become apparent from the following detailed description of illustrative embodiments thereof, which is to be read in connection with the accompanying drawings.

BRIEF DESCRIPTION OF THE DRAWINGS

FIG. 10 shows at least a portion of a template query statement, in accordance with an aspect of the invention;

FIGS. 13 and 14 show exemplary algorithms, in accordance with aspects of the invention;

FIG. 17 shows non-limiting exemplary inputs and results, in accordance with aspects of the invention.

DETAILED DESCRIPTION OF PREFERRED EMBODIMENTS

Figure 1:
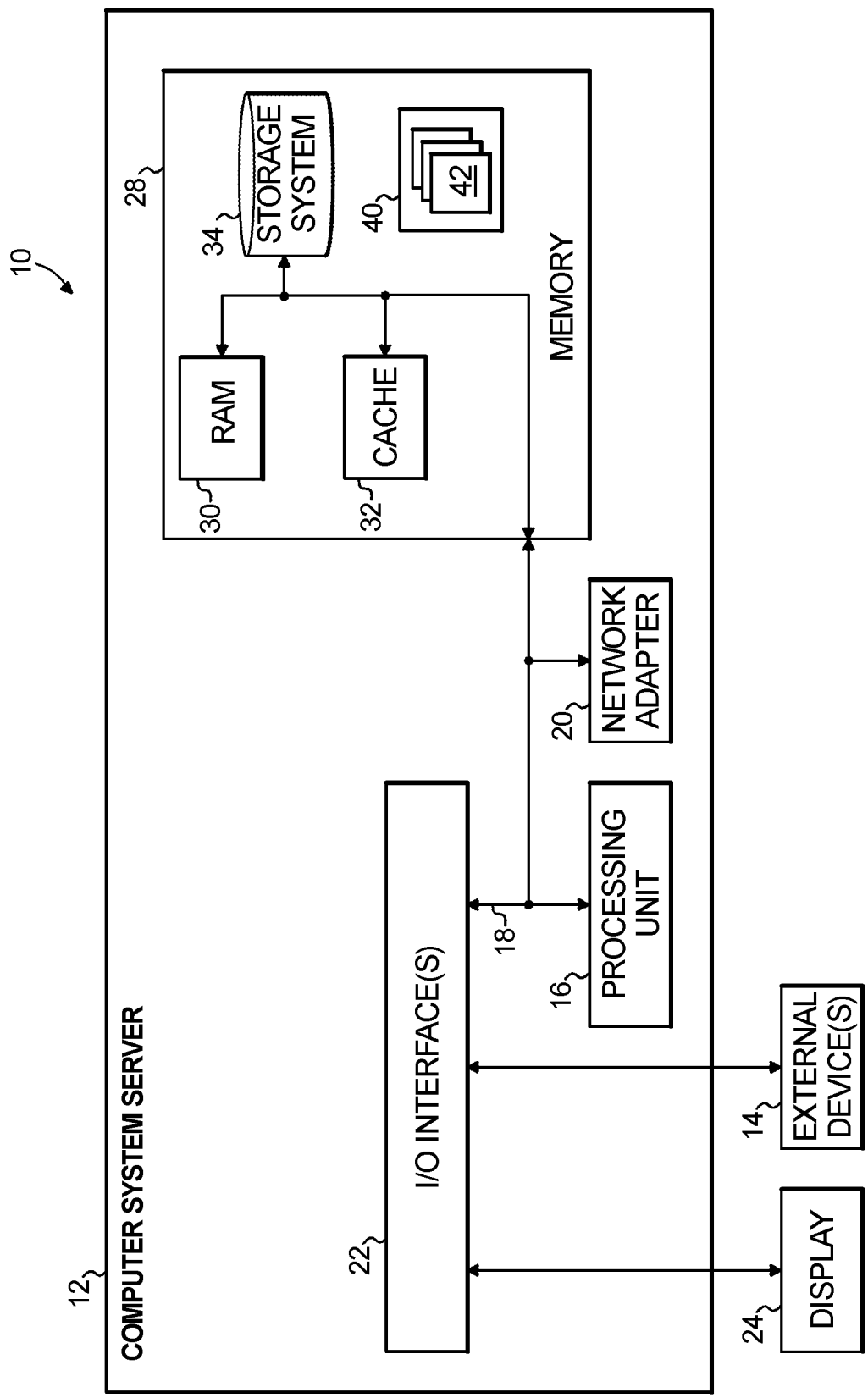
FIG. 1 depicts a cloud computing node according to an embodiment of the present invention.

One or more embodiments can be used in a variety of contexts. One or more embodiments can be used in connection with interactive acquisition of remote services, such as information technology (IT) services, both cloud-based and non-cloud based. Furthermore, regardless of what kinds of services are being acquired, one or more embodiments can themselves be computer-implemented, in cloud or non-cloud environments.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
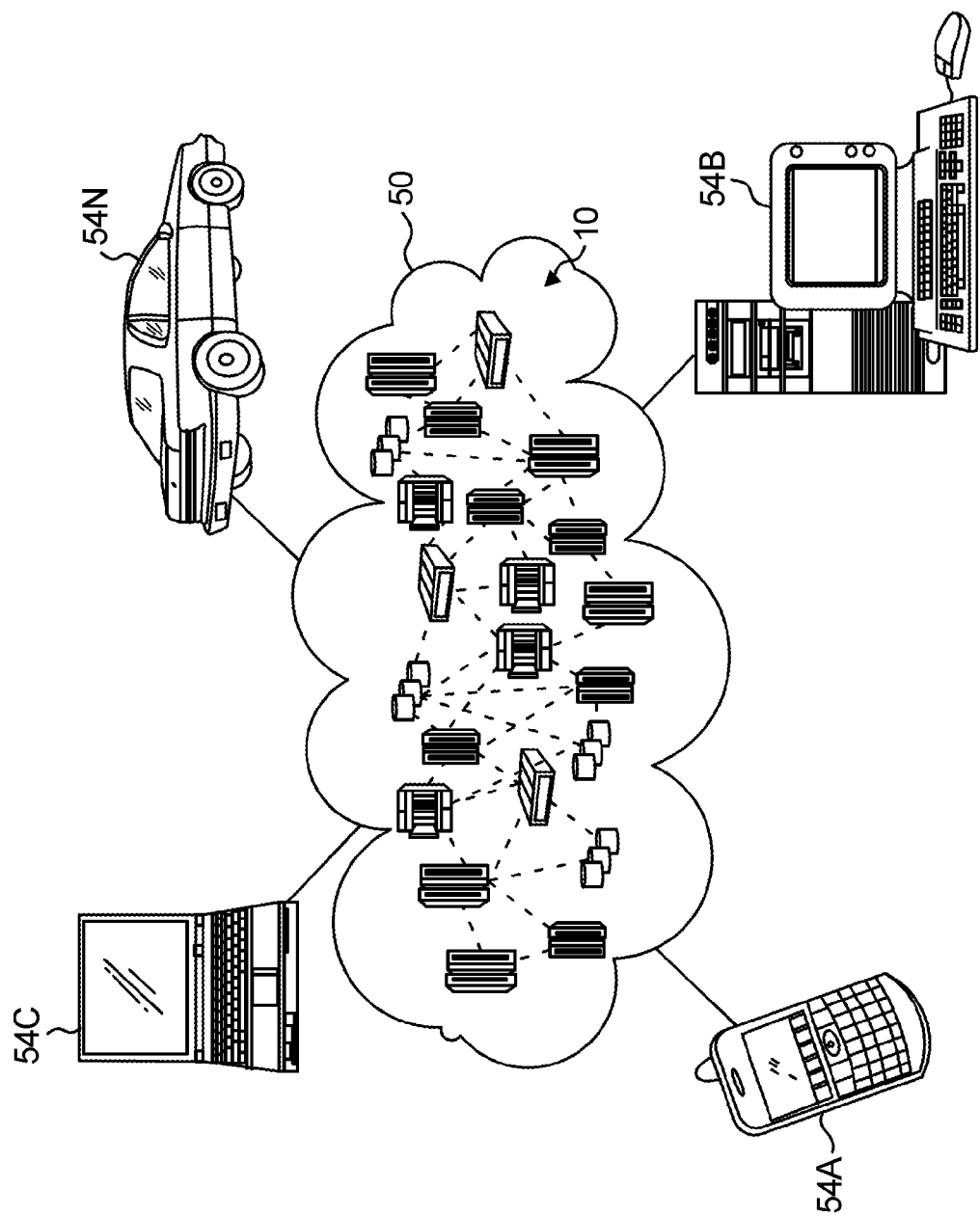
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
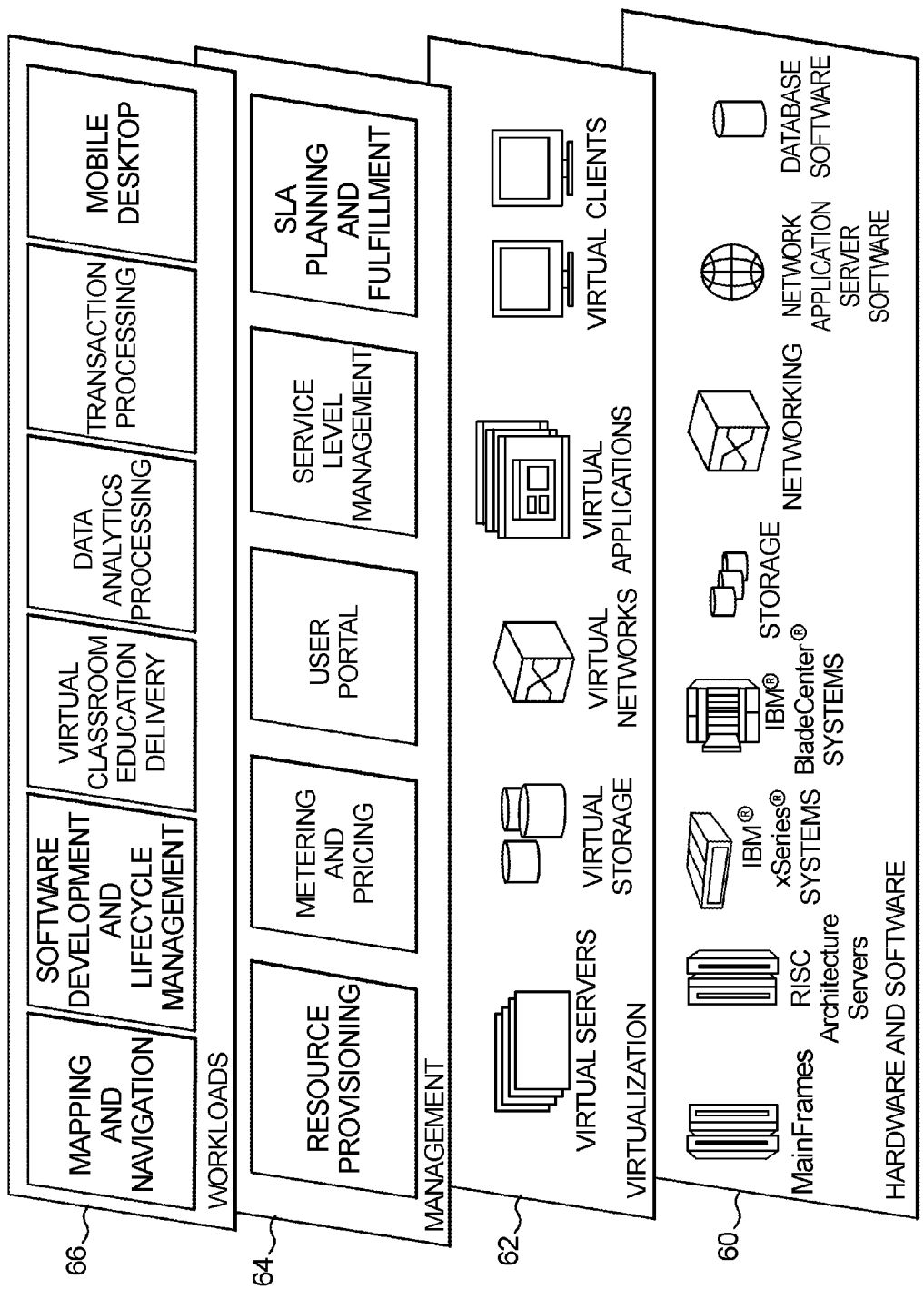
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, one or more embodiments can be used in connection with interactive acquisition of remote services, such as information technology (IT) services, both cloud-based and non-cloud based. Furthermore, regardless of what kinds of services are being acquired, one or more embodiments can themselves be computer-implemented, in cloud or non-cloud environments. Where one or more embodiments are themselves implemented in a cloud environment, they can reside, for example, in or above workloads layer 66, with access, for example, via a user portal in layer 64.

One or more embodiments provide a cloud services marketplace (CSM), which can be thought of as a "digital application distribution platform for services" (although again, the IT services involved may or may not be cloud based). One or more embodiments provide an intelligent online marketplace that facilitates services acquisition for enterprise customers. Traditional service acquisition is time-consuming and unable to provide customers with a systematic comparison of candidate services. In the era of "one click checkout" and pay-as-you-go service plans, customers expect services to be purchased online in an efficient and convenient manner. However, due to the unique and complex characteristics of services, existing keyword search-based marketplaces are less suitable for purchasing services. Advantageously, one or more embodiments provide a new generation of marketplace interfaces.

In CSM, exploring and configuring services is an iterative experience. The customers provide their requirements in natural language and interact with the system through a series of questions and answers. Based on a customer's input, the system can gradually "understand" what services the customer is looking for, narrowing down the potential candidates and profiling the configuration information of the candidate services at the same time. CSM's back end is built around a Services Knowledge Base (SKB) and leverages semantic web technologies to enable the semantical understanding of the customer's requirements. To quantitatively assess the value of CSM, experiments were conducted on real life use cases. The evaluation results demonstrate the efficiency and convenience of one or more embodiments employing this new service acquisition approach.

As noted, the development of virtualization technology has triggered the emergence of cloud services. Over the past several years, an increasing number of service vendors have migrated their traditional information technology (IT) services to the cloud. Due to their flexibility, convenience, and low cost, cloud services have gradually become a high priority for enterprise customers. However, as more services get to be available online, the question of how to track down a service satisfying a particular set of requirements rises as a new challenge for those customers. Traditionally, obtaining the desired service involves the following steps: (1) Survey all potential service vendors and identify the candidate services; (2) Visit the vendors' web sites and gather information about the services and vendors' contact venues; (3) Contact the services' agents for detailed information about their services and share with them both the functional and non-functional requirements of the researched service; and (4) Make a decision on the candidate services, proceed with purchase and on-boarding, and conduct service configuration. Due to the large number of vendors and services, the traditional service acquisition is tedious and time-consuming. Moreover, since each service vendor has its own ways of describing services, there is no systematic way for customers to compare similar services in terms of their features. Finally, as there are always new service vendors joining the market, it is constantly difficult for customers to have a complete list of vendors that may provide their desired services.

A possible quick solution to improve services acquisition effectiveness and efficiency would be to expose the services in an existing online marketplace such as Amazon (available from Amazon dot com, Seattle, Wash., USA, where the notation "dot" is used to avoid inclusion of browser-executable code in the text of this patent application) and ebay (available from eBay Inc., San Jose, Calif., USA). However, since these online marketplaces are specifically designed for selling commodity products, they are not suitable for service customers for the following reasons:

Services are typically more complex than goods. Current keyword or faceted based search technology exhibits strong limitations for customers to quickly locate services. A typical service is complex and it is nearly impossible to be described by a few keywords or a set of well pre-defined features.

Existing marketplaces do not support the handling of dependencies and integration. Dependency of one service upon another is a common aspect among services, while integration is often a required task of the service acquisition. However, existing marketplaces lack such notions and therefore are unable to support these two frequent service requirements.

Existing marketplaces lack the pay-as-you-go subscription model. Subscription models are not needed in the existing marketplaces because most of the commodity products are end products and as such they are to be consumed out of the box with a one-time-charge. However, most IT services are customizable and used over a multi-month/year period of time. Therefore, configuration and pay-as-you-go for each configuration of the service are significant aspects of the cloud services acquisition and operation.

A few cloud service oriented marketplaces, such as Amazon Cloud Marketplace, now known as AWS Marketplace, and HP Cloud (available from Hewlett-Packard Company, Palo Alto, Calif., USA), started to emerge in the market. However, their efforts on helping customers to resolve the integration of services address only their own customers' needs. Thus, these vendor-dedicated marketplaces avoid the problem of having the customer find their desired services out of a large pool of services from various vendors.

In the ecosystem of traditional IT services, there are two kinds of participants: consumers and vendors. The information they exchange during service matching procedures includes a bipartite graph with a many-to-many relationship between the participants. This kind of service ecosystem requires a strenuous effort for the service consumer to find a service matching the requirements. Indeed, once the number of candidate services is large, consumers are not likely to efficiently find a proper service, given that they need to consider the services' capabilities, functionalities and prices. On the other hand, the service vendors lack feedback from consumers regarding desired new services and/or desired improvements to existing services. One or more embodiments advantageously provide Cloud Services Marketplace (CSM) as a third participant to the existing ecosystem. CSM acts as an intermediary between service consumers and vendors. From a consumer's perspective, one or more embodiments of CSM offer any one, some, or all of the following advantages:

1. CSM simplifies the information exchange between service consumers and vendors. CSM becomes a hub interconnecting these two other kinds of participants. It simplifies the many-to-many relationships to two many-to-one relationships. First, the providers only need to contact CSM to on-board their services. Second, the consumers only need to contact CSM to obtain a specific service instead of the overwhelming interactions with a large number of vendors.
2. CSM can provide to consumers impartial information about services during their acquisition. CSM is able to perform a service evaluation and provide other consumers' feedback to the current consumer, thus offering a more objective assessment than those maintained individually by service vendors. Also, it can provide comparative information for similar services of different vendors, giving the consumers a more substantial input on the pros and cons of candidate services for their service selection decision.
3. CSM provides to consumers a more natural service acquisition approach. CSM provides an iterative conversational service acquisition approach which enables the consumers to depict their requirements and helps them to gradually narrow down the candidate services based on the requirements already known. This approach gives the consumer a feeling of talking to a real human agent. It overcomes the limitation of keyword based search on complex search requirements.

One or more embodiments advantageously provide a service acquisition system which helps customers to quickly obtain the desired services via a conversational interaction. In at least some instances, the system includes a plurality of distinct software modules, embodied on a computer-readable storage medium, which contain computer code which configures one or more hardware processors. In one or more embodiments, these modules include a service knowledge base, a conversation parser, and a dialog engine.

In one or more embodiments, CSM provides a rich set of features to facilitate the cloud services acquisition, including, for example, and one, some, or all of the following:

CSM supports user-friendly conversational interactions. As previously mentioned, the service acquisition is conducted via a conversational interface. This approach allows a service consumer to elaborate on the customer's complex requirements in an iterative way, typically letting CSM gradually ascertain and handle the real intentions of the customers. Thus, one or more embodiments avoid the situation where the consumer misleads the system by entering a large number of keywords.

CSM enables an efficient service acquisition by simultaneously filtering and configuring candidate services. Filtering and configuring are pertinent steps for service consumers to obtain a proper ad-hoc service. To further reduce the service acquisition time, CSM leverages a novel candidate filtering strategy which intelligently narrows down the candidate services search space through a minimal iteration count policy and elimination of as many candidate services as possible at each iteration. Moreover, by profiling the configuration parameters during the filtering stage, CSM avoids redundant iterations.

CSM has a rich knowledge about its IT services. To better "understand" the consumers' requirements, CSM leverages semantic web technology to describe service concepts. The service concepts and their relationships are in the form of ontology and are stored in a service knowledge base. By following the defined ontology, the available information is transformed into resource description framework (RDF). The skilled artisan will appreciate that RDF is a standard model for data interchange on the Web. In some embodiments, a crawler is employed to automatically collect meta-data for services from service web sites. Alternatively, or in addition, registration can be opened to service vendors to allow the vendors to enter their service into the knowledge base.

Figure 4:
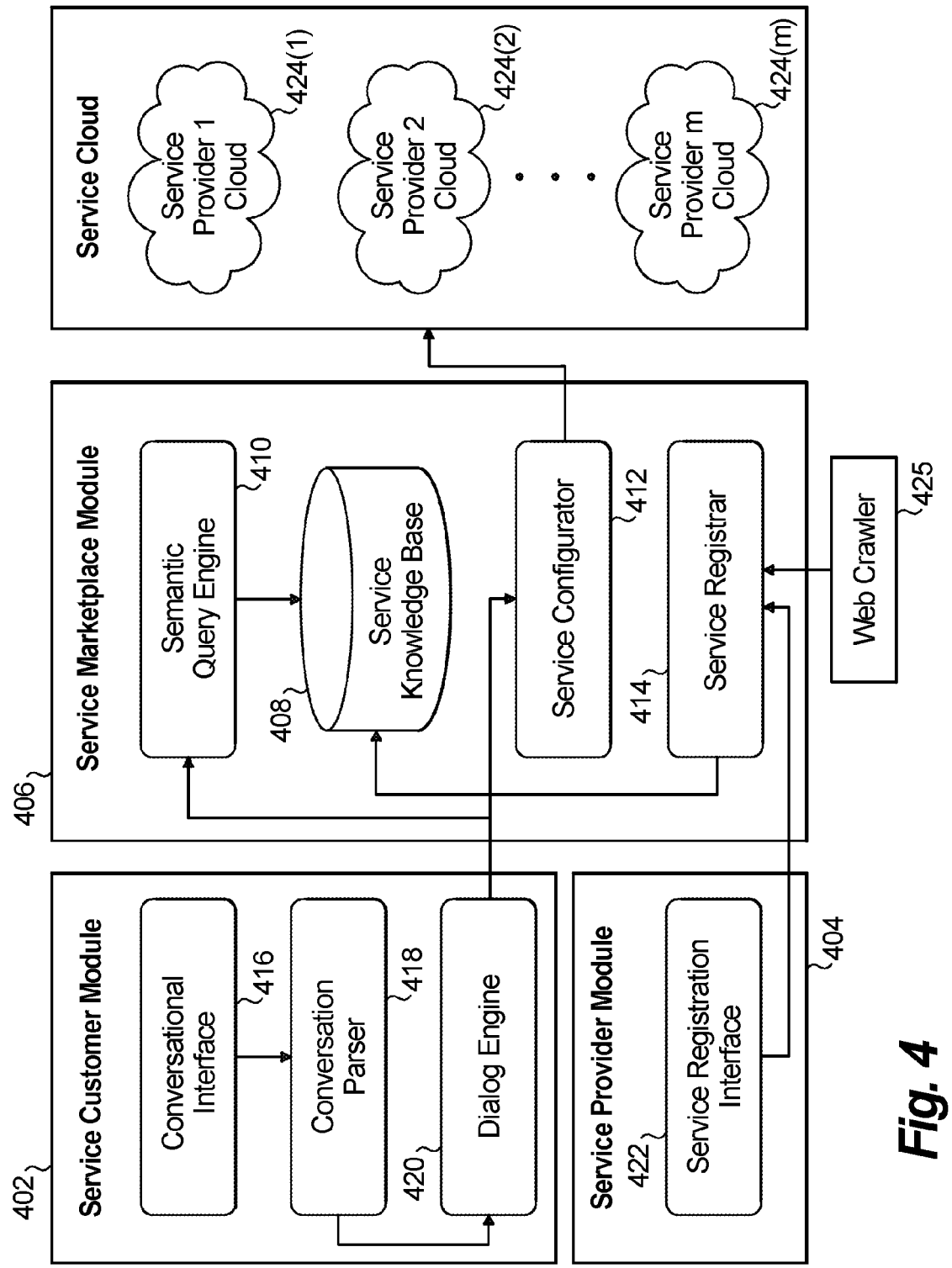
FIG. 4 shows an architecture diagram, in accordance with an aspect of the invention.

FIG. 4 shows an exemplary high level architecture for an embodiment of CSM. In the non-limiting example of FIG. 4, CSM is divided into three modules: Service Customer Module 402, Service Provider Module 404, and Service Marketplace Module 406.

Service Marketplace Module 406 maintains and provides functionalities to manipulate the service meta-data such as knowledge data, parsed requirement(s), and service request data. This module includes the Service Knowledge Base 408, Semantic Query Engine 410, Service Configurator 412, and Service Registrar 414. Each item is in charge of one particular set of tasks such as knowledge storage, knowledge retrieval, candidate service configuration, and new service profile registration, respectively. The Service Customer Module 402 handles interaction with the customers, parsing of the requirements, and guidance of the conversation, as supported by the Conversational Interface 416, Conversation Parser 418, and Dialog Engine 420, respectively.

One significant distinction between one or more embodiments of CSM and traditional on-line marketplaces is interaction with customers. The methodology of one or more embodiments of CSM involves iterative knowledge retrieval. This design is appropriate due to the unique characteristics and complexity of IT services, which require support for sophisticated and extendable service descriptions. Given that neither keyword search nor faceted search is applicable, an intuitive way to provide service matching is to allow the customers to express their requirements in natural language. One or more embodiments adopt a heuristic approach to this aim. That is, the customers do not need to provide all their requirements at once; they only need to provide initially partial or high level requirements. Then, based on the feedback from CSM, they can follow iteratively with the following requirements. Two practical considerations make this method a good choice:

(1) The feedback to the customers can inspire the customers and reinforce them to make correct decisions. Due to the complexity of service requirements, it is not easy for customers to organize their descriptions succinctly, clearly and completely from the first interaction with a system. It is common in the real world for people to not be able to express initially what they need, and then, with the help of a few hints, to make up their mind.

(2) It reduces the risk of misunderstanding customers' complex requirements. It is always easier to parse and handle simple sentences than to deal with complex paragraphs. State-of-the-art natural language processing (NLP) techniques are still challenged when it comes to understand meaning in a long paragraph. Moreover, CSM is expected to respond to customers in real time. Hence, even an NLP algorithm that is capable of understanding complex requirements may not be practical for CSM due to potential long processing time.

Figure 5:
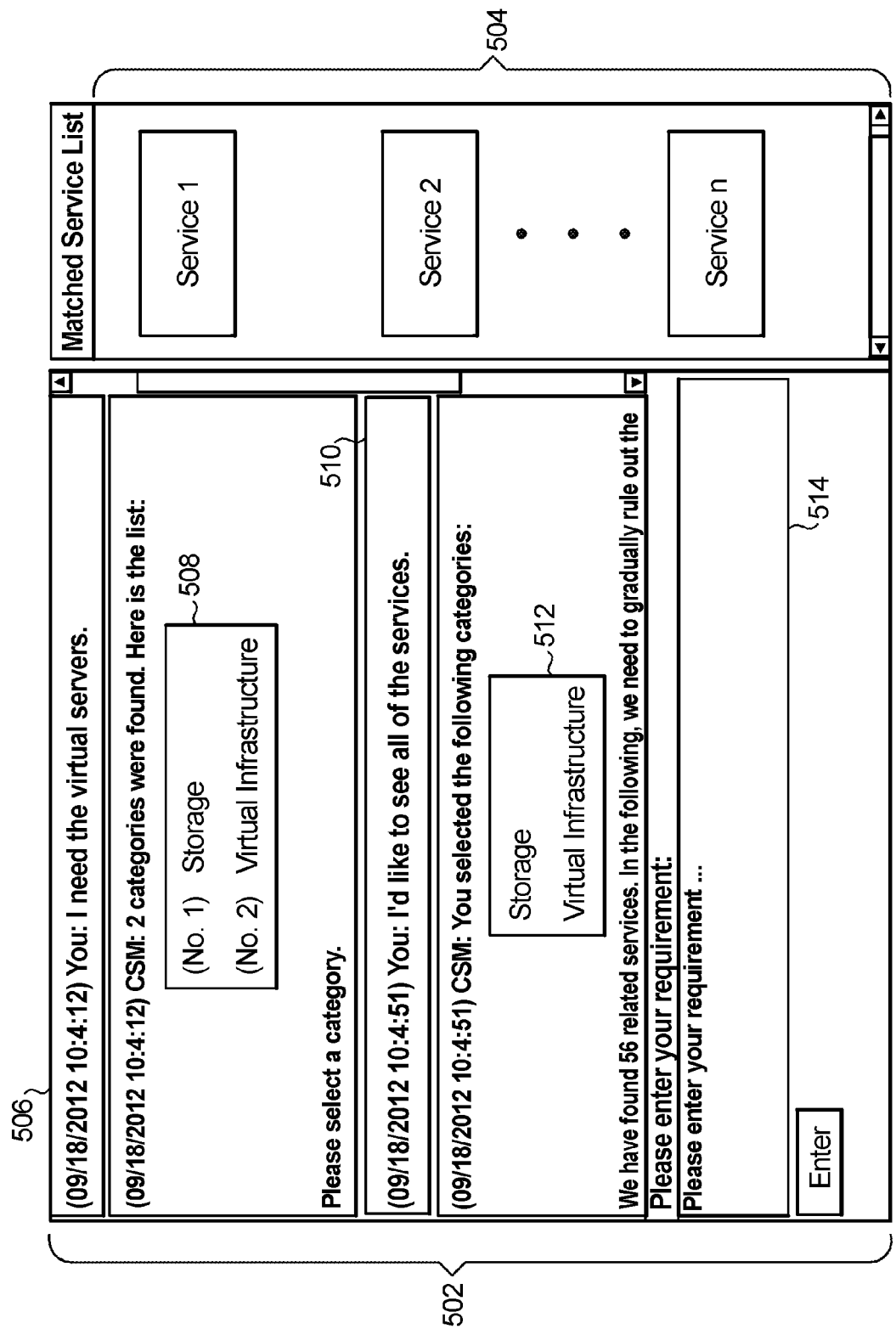
FIGS. 5-7 show screen shots of a conversational interface, in accordance with an aspect of the invention.
Figure 6:
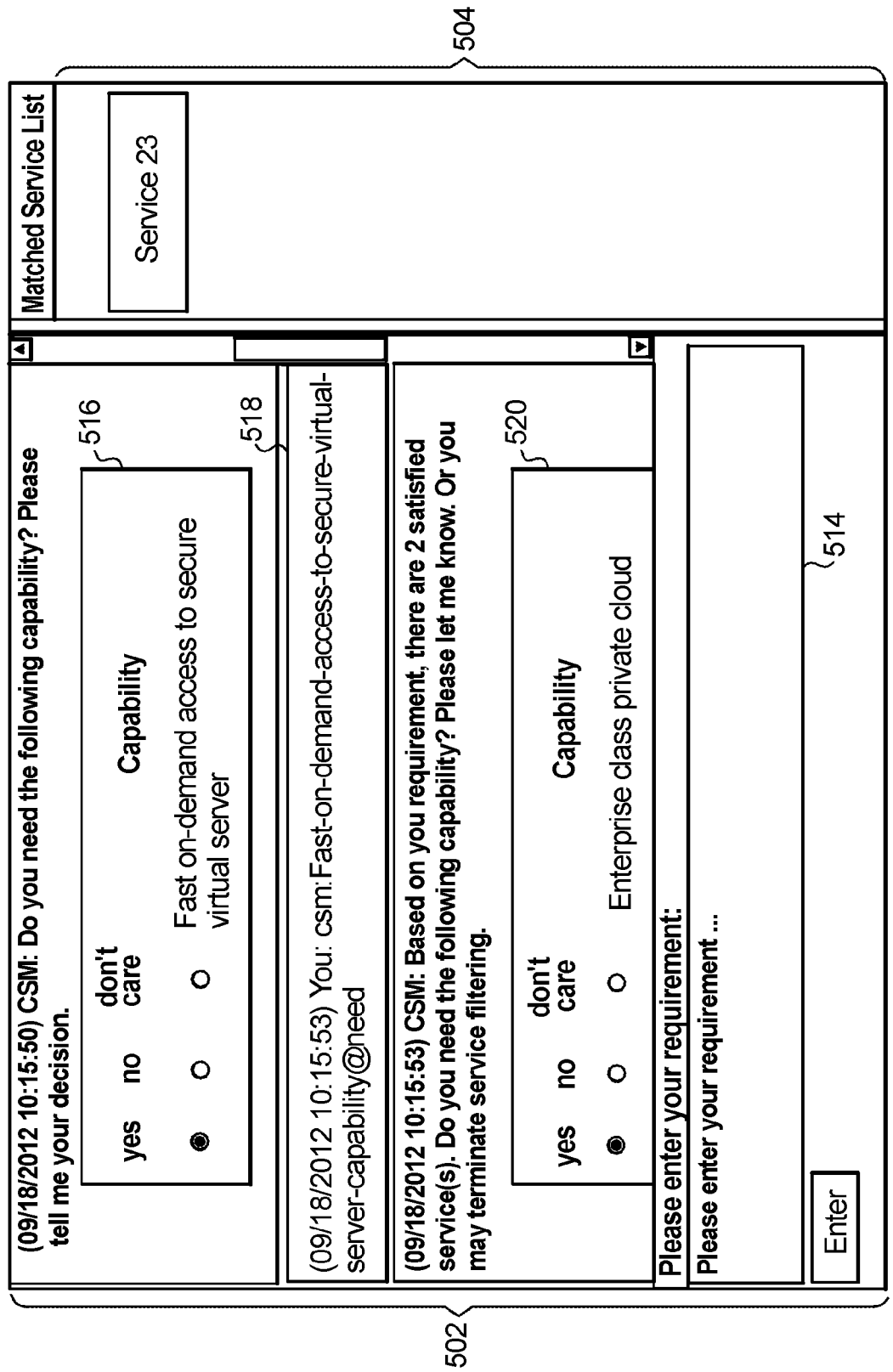
Figure 7:
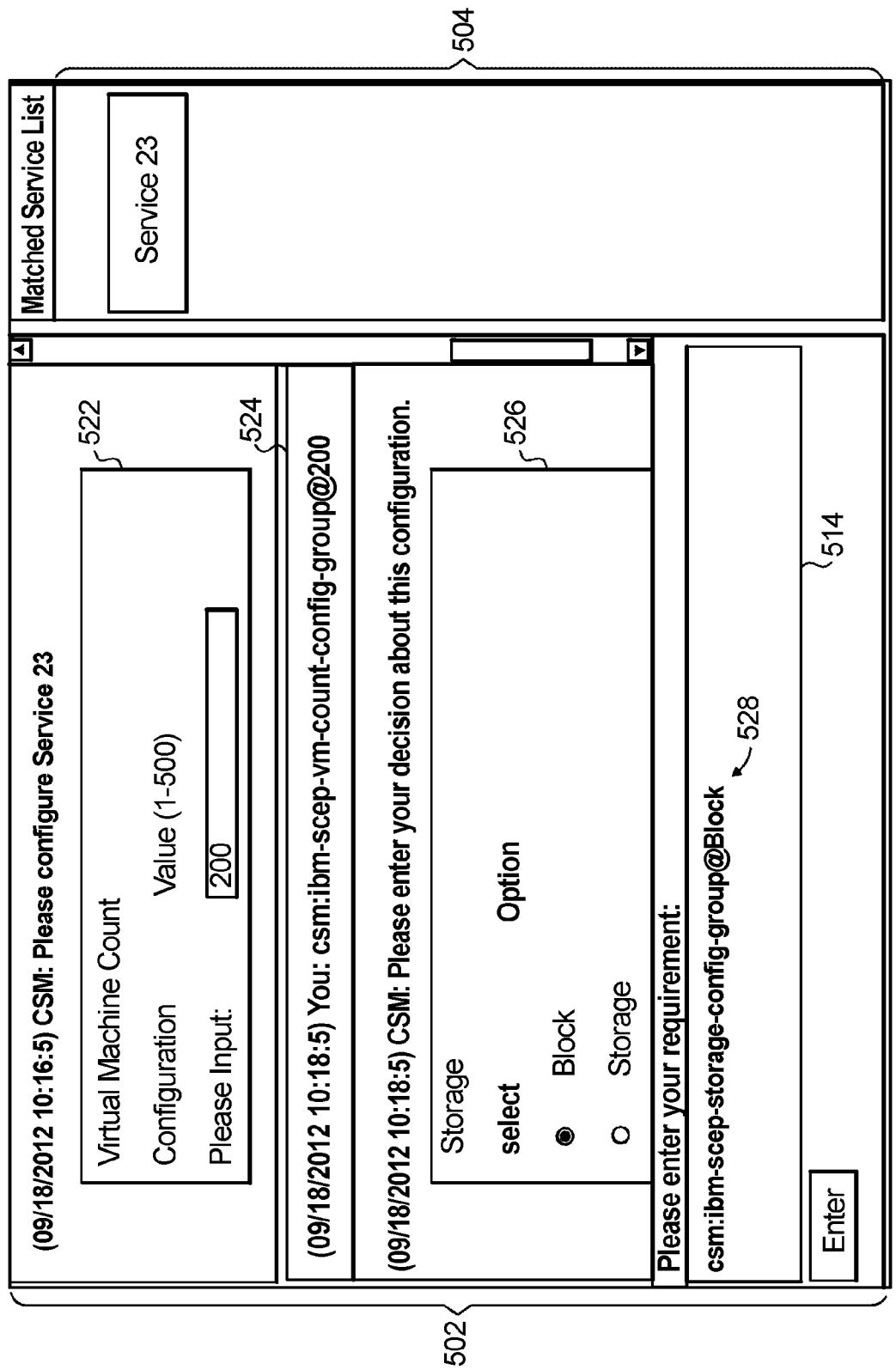

FIGS. 5-7 demonstrate how a customer interacts with CSM via the Conversational Interface 416. In some embodiments, the UI is divided into two parts: (1) the conversation area 502, which includes the conversation display area and the text input area 514, and (2) the candidate service list area 504, which displays the qualified candidate services selected based on the conversation. Space 514 is where the customer enters his or her input. As shown in the conversation area at 506, the customer intends here to find a virtual service solution, and thus the customer advises CSM "I need a virtual server." Based on this input, as seen at 508, CSM analyzes the requirement, finds and displays two matching service categories "Virtual Infrastructure" and "Storage," and waits for the customer's next input. At this point, as seen at 510, the customer tells CSM that the customer is willing to see all the related services. Accordingly, CSM retrieves all the relevant services (e.g., service 1 through n) and displays them on the right side at 504 under the "Matched Service List" heading. To further filter the matching services list, CSM provides the customer with the next level of details while simultaneously ruling out unqualified candidates and conducting service configuration, through a series of iterative question and answer procedures which guide the customer through the requirements.

In particular, in this non-limiting example, at 512, CSM confirms that the user has selected storage and virtual infrastructure. The system responds by advising that there are 56 related services (i.e., n=56) and that it will be necessary to gradually rule out some. At 516, the system queries the user to determine whether fast on-demand access to a secure virtual server is needed. At 518, the system confirms the user's affirmative input to the query at 516. At 520, the system advises the user that there two remaining candidate services, and queries the user as to whether an enterprise class private cloud is needed. The user clicks the "yes" button such that the list of candidate services is reduced to one, namely, service number twenty three. Of course, the trade names of the candidate services would typically be displayed; for example, "service 23" could correspond to IBM SMARTCLOUD ENTERPRISE PLUS cloud computing solution for enterprises, available from INTERNATIONAL BUSINESS MACHINES CORPORATION, Armonk, N.Y., USA. At 522, the user is prompted to configure the remaining service with the desired number of virtual machines. The user's input is confirmed at 524. At 526, the user is prompted to select "BLOCK" or "STORAGE." The user selects "BLOCK" as shown by the clicked button in region 526 and at 528 in region 514.

Obtaining service knowledge is a significant aspect to enable CSM to conduct service acquisition. In one or more embodiments, a service knowledge base (SKB) 408 is maintained. To appropriately represent the knowledge in the IT service realm, discussions are held with domain experts and an ontology is constructed to model the entities and relations. Following the schema of the ontology, the corresponding features are extracted from available service descriptions and/or profiles. These are transformed into RDF format and stored into specified knowledge database.

An ontology is chosen to represent the knowledge, in one or more embodiments, because it elegantly extends the entity-relationship model with reasoning ability to represent the data. Comparing with ER-model based storage (the way people store the data in a relational database), an advantage of storing the knowledge in RDF with ontology is that it enables the data user (CSM in this context) to express more knowledge than it actually stores. Because of the reasoning rules defined in the ontology, extra knowledge can be dynamically retrieved through semantic inference.

Figure 8:
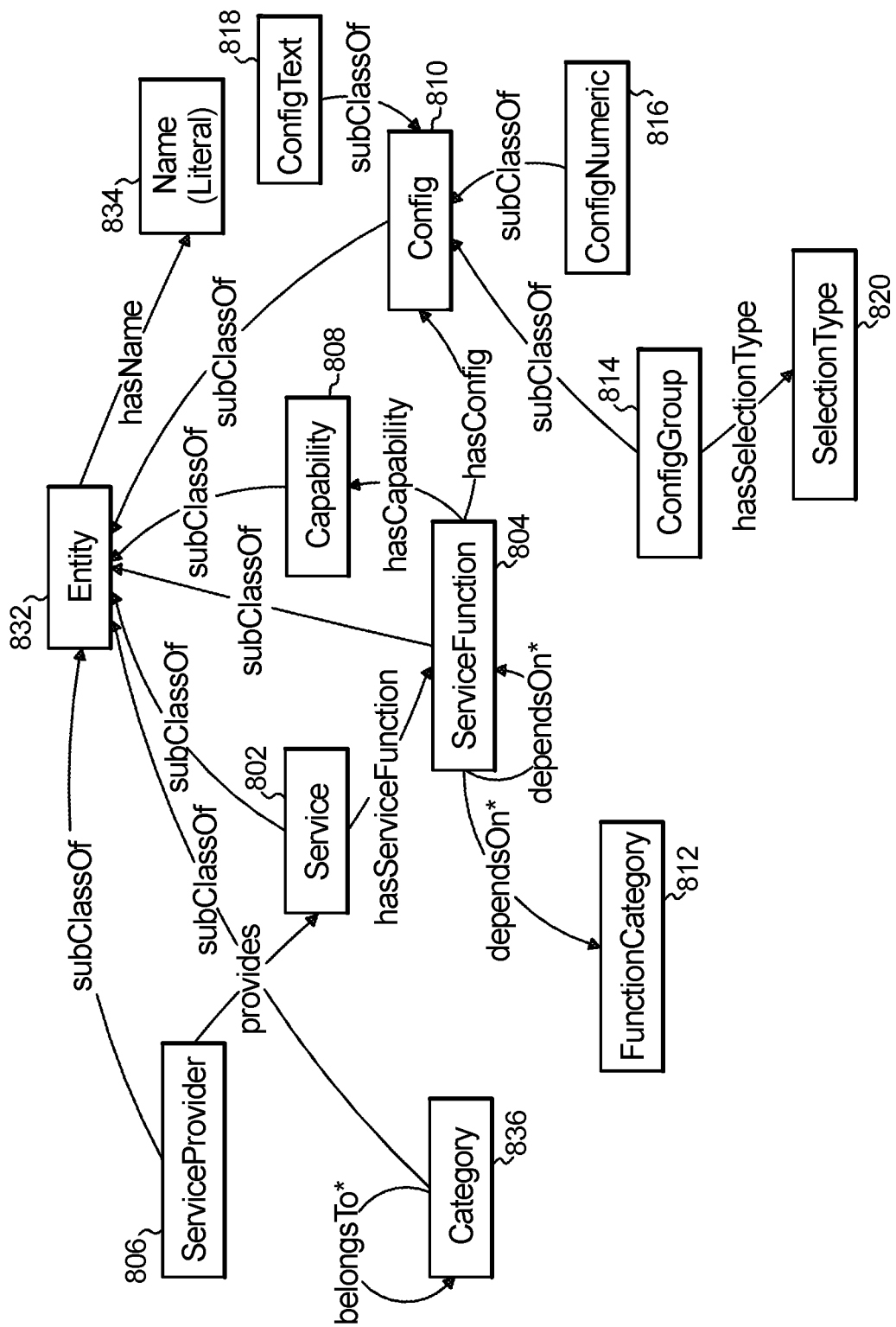
FIG. 8 shows an exemplary ontology of services knowledge, in accordance with an aspect of the invention.

FIG. 8 shows exemplary core aspects of an exemplary ontology; in particular:

'Service' 802 is a significant concept in service ontology. In one or more embodiments, each 'Service' is only a container; it contains one or more 'ServiceFunction' 804 and only belongs to one 'ServiceProvider' 806. Also, 'Service' 802 has several basic features such as 'Name' 834 and 'Description.' Note that 'Service' 802 is a subclass of 'Entity' 832 and derives all its features; entity 832 has name 834.

Each 'ServiceFunction' contains one or more 'Capability' 808 and 'Config' 810. Moreover, a 'ServiceFunction' 804 belongs to only one 'FunctionCategory' 812, which is a sub-class of 'Category' 836. In one or more embodiments, a service is categorized indirectly by the 'ServiceFunction' 804 it contains. This is because any ability and/or functionality it has is supported by a concrete 'ServiceFunction'. Therefore, it is natural to categorize the services by the 'ServiceFunction'.

'Config' 810 records the configuration information of a 'ServiceFunction' 804. There are three sub-classes of 'Config,' namely, 'ConfigGroup' 814, 'ConfigNumeric' 816, and 'ConfigText' 818. 'ConfigGroup' 814 provides a collection of choices for configuration. The customer may select zero, one or several options based on the corresponding 'SelectionType' 820. 'ConfigNumeric' allows the customer to enter a number to configure the service. For example, the number of users allowed to simultaneously use the service is a kind of 'ConfigNumeric.' ConfigText allows the customer to enter a piece of text to configure the service, such as the uniform resource identifier (URI) of a remote database and user name for an account.

Each 'ServiceFunction' 804 can depend on one or more 'ServiceFunction' or 'FunctionCategory' 812. Take the web server; for example, Microsoft's Internet Information Services (IIS) can only be deployed on top of Windows. It depends on a particular 'ServiceFunction' named 'Microsoft Management Console,' which is a function that belongs to the service 'Windows Virtual Machine.' Another web server, Apache Tomcat 5, can be deployed on most operating systems (OS). Therefore, instead of depending on a concrete 'ServiceFunction,' it depends on a 'FunctionCategory' 812 called 'Virtual Server,' which might contain any kind of OS. Besides the entities, there are mainly three sub-relationships of: (1) 'dependsOn': 'requires' (2) 'optionalDependsOn' and (3) 'canBeReplacedBy.' Their meanings can be explained as follows: Suppose service function A depends on B. If A requires B, then A cannot work without B. The sub-relationship 'optionalDependsOn' illustrates that one of the extensible capabilities of A depends on B. If the extensible capability needs to be activated, then B is necessary. The sub-relationship 'canBeReplacedBy' illustrates that one of the sub-modules of A can be replaced by B, but the replacement is not mandatory.

One or more embodiments employ WordNet, a semantic database for English, to tag the 'FunctionCategory' 812. The tags are used during the conversation parsing, and can help CSM to quickly locate the semantically related 'FunctionCategory' based on the input. More details about the usage of WordNet are discussed below. WordNet is a non-limiting example of a lexical database; other lexical databases can be used in other embodiments.

Figure 9:
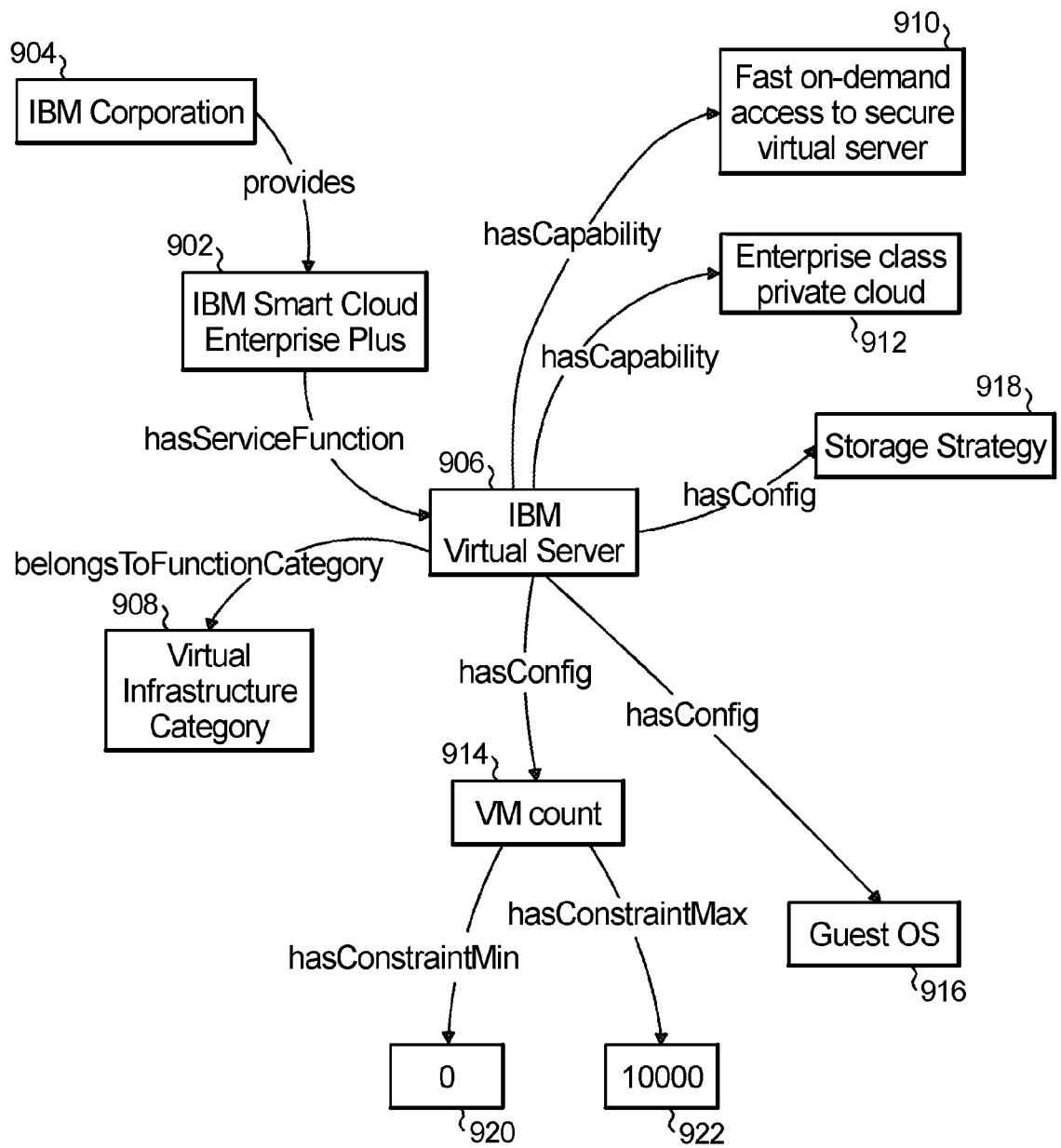
FIG. 9 shows example knowledge as it relates to an exemplary cloud environment, in accordance with an aspect of the invention.

To illustrate the service ontology in FIG. 8, a non-limiting specific example is provided in FIG. 9. As is shown, the service IBM SMART CLOUD ENTERPRISE PLUS 902 is 'providedBy' 'IBM Corporation' 904 and contains function 'IBM Virtual Server' 906. 'IBM Virtual Server' belongs to category 'Virtual Infrastructure Category' 908. Moreover, it contains two 'Capability': 'Fast on-demand access to secure virtual server' 910 and 'Enterprise class private cloud' 912, and three 'Config': 'VM count' 914, 'Guest OS' 916, and 'Storage Strategy' 918. As for the three 'Config,' 'VM count' 914 is in type 'ConfigNumeric' with 'Min' 920 set to 0 and 'Max' 922 set to 10000. 'Guest OS' and 'Storage Strategy' are both in type 'ConfigGroup' and each contains several configuration options.

Consider now conversation parser 418. Some embodiments do not carry out complex NLP parsing for customer's input. This is appropriate in some embodiments because:

(1) The iterative style of service acquisition reduces the semantic complexity of the input. In an iterative conversation, the average length of the customer's input is decreased, because the customer does not need to input all of his or her requirements at once. Therefore, the semantic complexity of the input is reduced accordingly.

(2) The customer has no motivation to input a complex sentence. The goal of the customer is to find proper services instead of challenging CSM, so the customer would not intentionally input confounded sentences to trouble the system, which would be contradictory.

(3) Based on current NLP parsing techniques, complex parsing is not practical in real time systems. As mentioned before, CSM should preferably be able to respond to the customer in real time.

Some embodiments only parse the input of the first few conversation iterations to determine which service categories and service capabilities the customer may be interested in. For the following iterations, the system guides the customer to conduct the service filtering and configuration under control, as discussed below with regard to the dialog engine. The customer provides some ad-hoc information into given input components, which does not require NLP parsing.

In some instances, CSM only extracts the word(s) that is/are related to service categories and capabilities. Based on the assumption that the customer would not input complex compound sentences containing double negatives, subjunctives, or if-else constructs, one or more embodiments treat the inputs as directive sentences. Concretely, the parsing can be described as including following steps: (1) Extract verbs and nouns from sentences. (2) Remove stop words (words that occur so frequently in the service domain that they are not useful for distinguishing one service from another; thus, ignored during a search). (3) Divide words into include and exclude sets based on grammar structure in the sentence. Each word in a set is called a seed word. (4) Propagate these two sets with WordNet. (5) Find corresponding category and/or capability via WordNet tag annotation.

To better understand how the sentences are processed, consider the following example input from a customer:

"I need to pay my employee, and I want the service to generate the reports."

Based on the above sentence, the following words are extracted: need, pay, employee, want, service, generate, reports. Then three stop words, need, want, and service, are removed. The last word "service" is treated as a stop word because it is too common in the realm of IT services. Since there is no negation in the sentence, all the remaining words (pay, employee, generate, reports) are put into the include set. Thereafter, find the associated synsets (including the synonyms, hypernyms, meronyms etc.) of each word via WordNet to propagate the set. Finally, a SPARQL query statement is generated to retrieve all related 'Function Category' and 'Capability' that are annotated with the words in the include set. The template query statement is shown in FIG. 10.

In the query statement of FIG. 10, $var_1$ denotes the word in the include set in step (5). Starting from step (4), CSM propagates each seed word and generates queries based on the seed words along with their propagated words in parallel.

Figure 11:
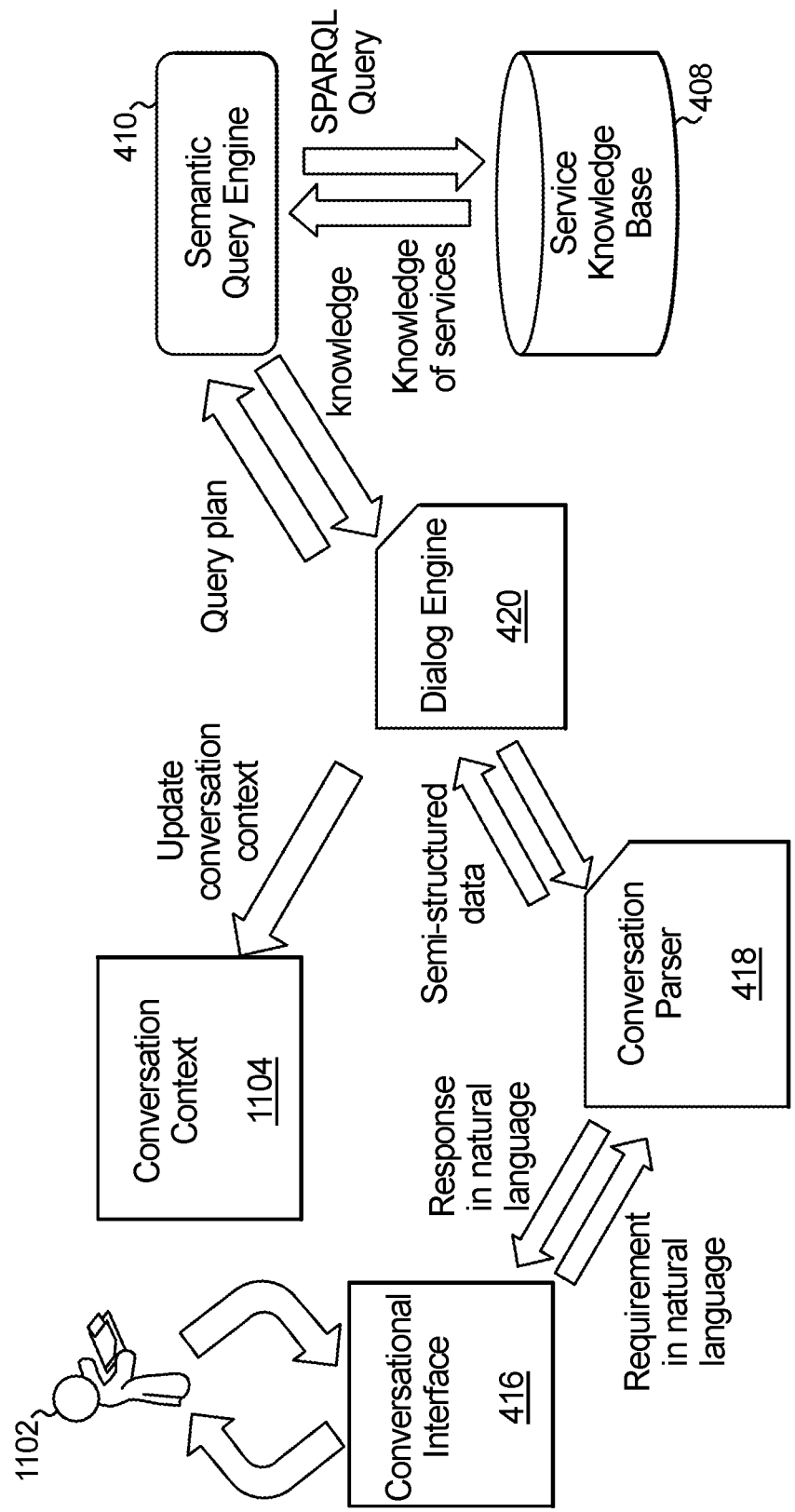
FIG. 11 shows an exemplary workflow for a dialog engine, in accordance with an aspect of the invention.

The Dialog Engine 420 guides the conversation and coordinates user input processing and back-end information retrieval. FIG. 11 illustrates how the dialog engine works with other modules in one iteration of a conversation. At the very beginning, the customer 1102 tells CSM about his or her requirement via the conversational interface 416. Afterwards, the customer's input is sent to the back end (i.e., modules depicted in FIG. 11 other than conversational interface 416). The conversation parser 418 parses the input, transforms the result into a pre-defined semi-structured data, and then sends it to the Dialog Engine 420. Afterwards, the Dialog Engine conducts corresponding actions based on the current conversation context. If necessary, the Dialog Engine 420 invokes the Semantic Query Engine 410 to retrieve needed knowledge from Service Knowledge Base 408 via a SPARQL query. Receiving the retrieved data, the Dialog updates the metadata accordingly, including the user's input and the index of candidate services, and, at the same time, updates the conversation context 1104 according to the logic flow in FIG. 12 to continue the conversation. Finally, the Dialog Engine 420 sends a response back to the Conversation Parser 418, and the Conversation Parser reversely parses the response from semi-structured data into natural language, with predefined natural language templates. Two significant tasks for the Dialog Engine are control of the conversation flow and effective location of the proper services for the customer. These are discussed further below.

Conversation Flow Control:

Since one or more embodiments of CSM are used as a service acquisition portal, the conversation between the customer and CSM should preferably be controlled to remain in the context of service acquisition; otherwise, the conversation may drift off in directions that are not pertinent.

Figure 12:
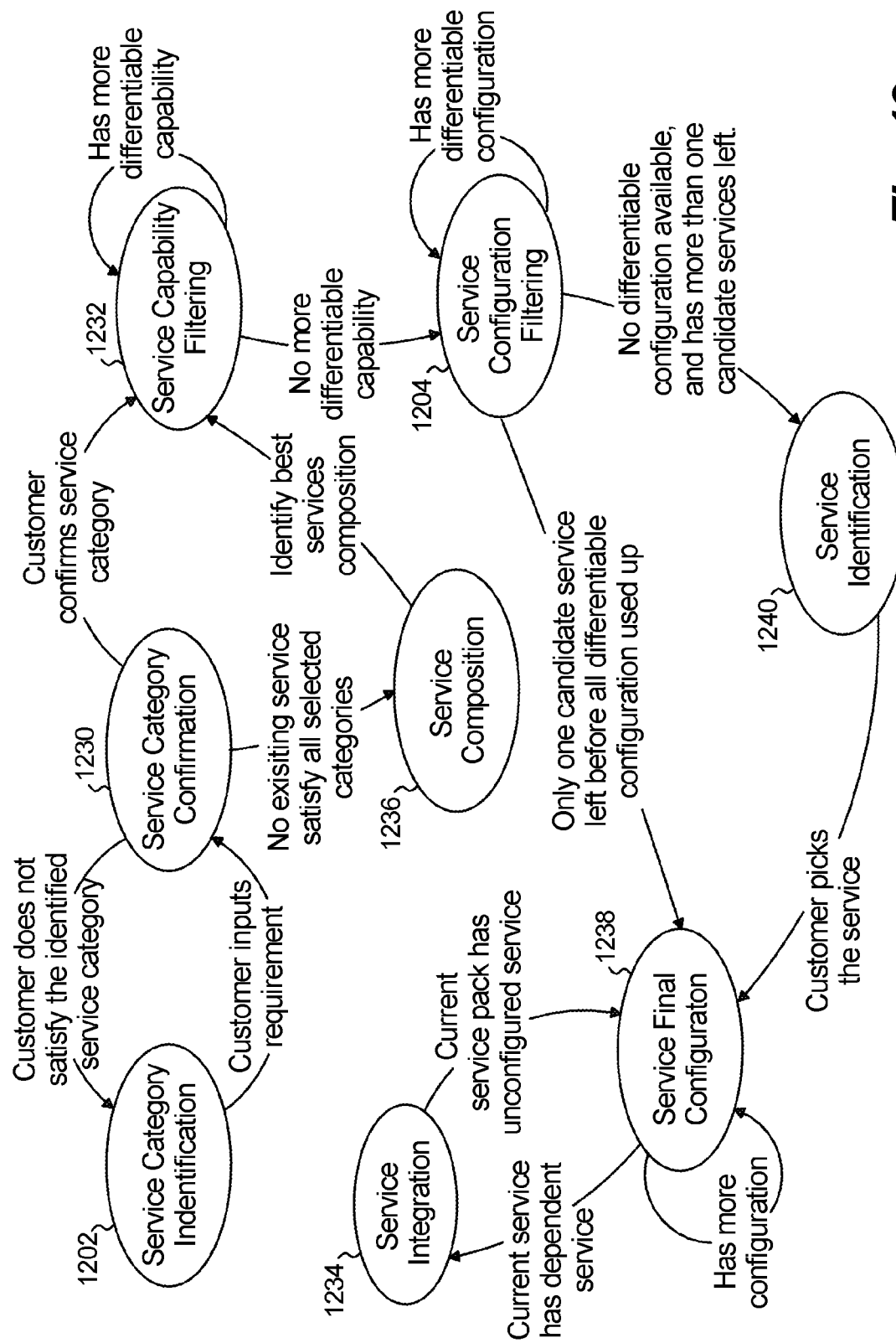
FIG. 12 shows an exemplary logic flow, in accordance with an aspect of the invention.

In order to control the conversation, IT services domain experts can be consulted to assist in defining logic flow. The logic flow can be modeled as a directed graph:

$$G(V, E),$$

where vertex V denotes the context state and edge E denotes the transition between contexts. FIG. 12 shows exemplary topology of the logic flow. Based on the discussion with domain experts, initially define eight main context states 1202, 1204, 1230, 1232, 1234, 1236, 1238, 1240 (along with several exception handling states, omitted for clarity and brevity) and fourteen transitions (labeled arrows between the states). One or more embodiments of CSM use a finite state machine to store the information of the conversation logic flow. The topology of the logic flow can be freely changed by adding more context states and/or updating transitions.

At the beginning of each conversation (recognized as the creation of a new session), Dialog Engine 420 creates the profile for the current session, and sets the current state as Service Category Identification 1202. In this state, CSM assumes that the customer's input is related to the scenario of looking for proper service categories. If CSM cannot find useful information from the customer's input regarding the services categories, it enters a corresponding exception handling state and prompts the customer to input context related information.

More particularly, the customer inputs a requirement at 1202 and the system attempts to identify the corresponding pertinent category. At 1230, if the customer confirms the service category, move on to step 1232; otherwise, loop back to step 1202 and seek additional input for clarification. Furthermore in this regard, if an existing service is a good fit, the customer confirms the service category, and flow passes to step 1232. On the other hand, if an existing service is not a good fit, flow proceeds top service composition step 1236 where the best services composition to meet the customer's needs is identified, and then flow proceeds to step 1232.

In step 1232, continue to drill down until there is no more differentiable capability, then proceed to step 1204. In step 1204, continue to drill down until there is no more differentiable configuration. If only one possible choice remains, there is no need for any additional customer input; proceed directly to step 1238. On the other hand, if more than one possible choice remains, proceed to service identification step 1240 to receive additional customer input, then proceed to step 1238. Regarding step 1238, note that in some instances, the customer may feel after step 1204 that some refinement of the configuration is needed; this is reflected in step 1238. Proceed then to the final service integration step 1234 wherein any dependent services are integrated; this continues in an iterative manner as long as there are any un-configured (dependent) services in the current service pack.

Services Filtering:

After identifying service categories, the customer receives a list of candidate services. In the usual case, there are a large number of candidates and it is impractical for the customer to browse through the whole list, especially when the customer is not familiar with the candidates. In the logic flow, two states are responsible for candidate services filtering. The unqualified services are ruled out through a series of questions and answers regarding service capability and configuration category. Non-limiting examples of questions include:

'Do you need the capability X?'
'Please make a choice about the following options: 1. X, 2. Y, 3. Z.'
'Please enter the value about the X.'

The more questions the customer answers, the more unsatisfactory services can be pruned. However, too many questions may degrade the quality of the user experience. To make the service filtering effective, one or more embodiments provide a novel method referred to as Iteration-Min to reduce the iterations for the questioning and answering.

In one or more embodiments, to reduce the number of iterations, find a sequence of questions $Q=\{Q_1, Q_2 \ldots Q_n\}$ with the least length to rule out all unsatisfied candidate services via capability or configuration. Quantitatively, use eff(Q) to evaluate how effectively the sequence can filter the candidates. The effectiveness of a question sequence can be considered as the sum of the effectiveness of all its questions, i.e., $\text{eff}(Q)=\Sigma_i \text{eff}(Q_i)$. Concretely, the effectiveness of a question is qualified as the expected number of candidates it can prune, i.e. $\bar{n}_{prune}$, based on the customer's potential answer. There are three types of questions and their effectiveness is evaluated differently:

1. Question regarding capability: This kind of question would ask the customer about whether the specific capability is required. The effectiveness of this kind of question is quantified by the expected number of candidates it can prune if the customer answers yes, no, or do not care, i.e.

$$\text{eff}(Q)=\bar{n}_{prune}=p(\text{yes})n_{yes}^{(Q)}+p(\text{no})n_{no}^{(Q)}, \qquad (1)$$

where p(yes)/p(no) denotes the probability that the customer would choose yes/no, and $n_{yes}^{(Q)}/n_{no}^{(Q)}$ denotes the number of candidate services that can be pruned for the current question Q if the customer chooses yes/no.

2. Question regarding 'ConfigGroup': The quantification is similar to that for capability. Suppose a ronfig-Group' includes m options $\{o_1, o_2, \ldots, o_m\}$, the effectiveness of the question regarding this configuration can be quantified as:

$$\text{eff}(Q) = \bar{n}_{prune} = \sum_{i}^{m} p(o_i)n_i^{(Q)}, \qquad (2)$$

where $n_i^{(Q)}$ denotes the number of candidate services that can be pruned if the customer chooses $o_i$ for the current question Q, and $p(o_i)$ denotes the probability that the customer would select option $o_i$.

3. Question regarding 'ConfigNumeric': The expectation of the possible input for a numeric configuration is the mean of the domain. The domain $[\text{dom}_{min}, \text{dom}_{max}]$ is decided by the 'Min' and 'Max' of all the configurations belonging to the same 'ConfigCategory' in the SKB, i.e. $\text{dom}_{min}=\min\{\text{dom}_{min}|\text{dom}_{min}\epsilon C_i\}$ ($\text{dom}_{max}$ is decided in the same way), where $C_i$ denotes the 'ConfigCategory' whose effectiveness needs to be calculated, and $\text{dom}_{min}$ denotes the 'Min' of the concrete configuration ('ConfigNumeric' belongs to this 'ConfigCategory'). The effectiveness of this kind of configuration can be quantified as:

$$\text{eff}(Q)=n_{ex}^{(Q)}, \qquad (3)$$

where $n_{ex}^{(Q)}$ is the number of candidate services whose corresponding configuration domains do not contain the mean for the configuration in the current question Q. As for the mean, maximum-likelihood estimation (MLE) can be leveraged to obtain the sample mean of the empirical distribution of customer input history regarding this configuration.

In the above formulas, the probabilities (p(yes), p(no), $p(o_i)$) can be estimated, for example, via an empirical distribution obtained from customer history. As for the cold start with no customer history, in one or more embodiments, uniform distribution is used instead.

Note that one or more embodiments do not leverage the 'ConfigText' which requires a textual input to generate the question.

From the perspective of the traditional optimization problem, the goal of picking the question sequence is to find the one that maximizes the effectiveness, i.e.

$$eff^*(Q) = argmax_Q \sum_i eff(Q_i) \quad (4)$$

In at least some instances, the best question sequence cannot be obtained via pre-computing, because the variables ($n_{yes}^{(Q)}$, $n_{no}^{(Q)}$, $n^{(Q)_i}$, $n^{(Q)_{ex}}$) used for computing the effectiveness of a single question would change according to the answer of the previous question, making $eff(Q_{i+1})$ depend on the answer of $Q_i$. Therefore, one or more embodiments of CSM dynamically compute the next best question based on the previous answer on-the-fly. Alternatively, the objective function becomes:

$$eff^*(Q) = \sum_i argmax_Q eff(Q_i) \quad (5)$$

One or more embodiments separate the filtering into two states so that logic flow matches the real workflow of service acquisition. As is shown in FIG. 12, services are filtered by capability and then configuration. The following illustrates how to pick the next configuration for filtering in one or more embodiments. Picking capability is conducted in a similar way.

When the current state is set to Service Configuration Filtering 1204, the "add" algorithm shown in FIG. 13 is called for each configuration. This operation registers each configuration to its category and updates the unionedCfg (in FIG. 13; takes the union of all the configurations.) accordingly. Referring to FIG. 13, during the filtering, Dialog Engine 420 maintains two hash tables: $tbl_{category}$=hashtable(categoryID, unionedCfg), and $tbl_{config}$=hashtable(categoryID, list(config)). The two hash tables are used to store the meta-data needed during computing. Note that for each 'ConfigCategory,' there is one corresponding unionedCfg, which is the same as ordinary configuration in terms of structure. In a 'ConfigCategory' whose elements are multiple choice configurations, unionedCfg takes the union of all their options; in a 'ConfigCategory' whose elements are numeric, unionedCfg takes the union of their domains.

Whenever the customer answers a question, the next configuration is picked according to operation genNext as depicted in Algorithm 2 of FIG. 14. Operation genNext first records the answer for the previous question. Then it removes the useless data from the two hash tables including the entries belong to the previous picked 'ConfigCategory,' and the meta-data related to unsatisfied candidates is removed. Finally, Operation genNext calculates the effectiveness for each of the remaining 'ConfigCategory' and returns the one with the highest score.

Note that if the data is very large, these two operations can be extended in a distributed way by substituting the hash tables with distributed hash table (DHT).

Populating the Knowledge Base 408:

In one or more embodiments, populating service definitions is conducted in two stages: knowledge filling and tagging.

Knowledge Filling:

There are two approaches for knowledge filling: automatic knowledge filling and service vendor registration. For automatic knowledge filling, a crawler is used to obtain the service profiles from target web sites such as service vendor's web sites and online service registration web sites.

Tagging:

This procedure is to assign a set of semantically related words to a 'FunctionCategory' so customers can locate the category when they mention semantically related words. WordNet, familiar to the skilled artisan, can be employed to find out the hypernym, meronym, and holonym of the 'FunctionCategory.' This is done automatically after a new 'FunctionCategory' is filled into SKB.

Figures 15, 16:
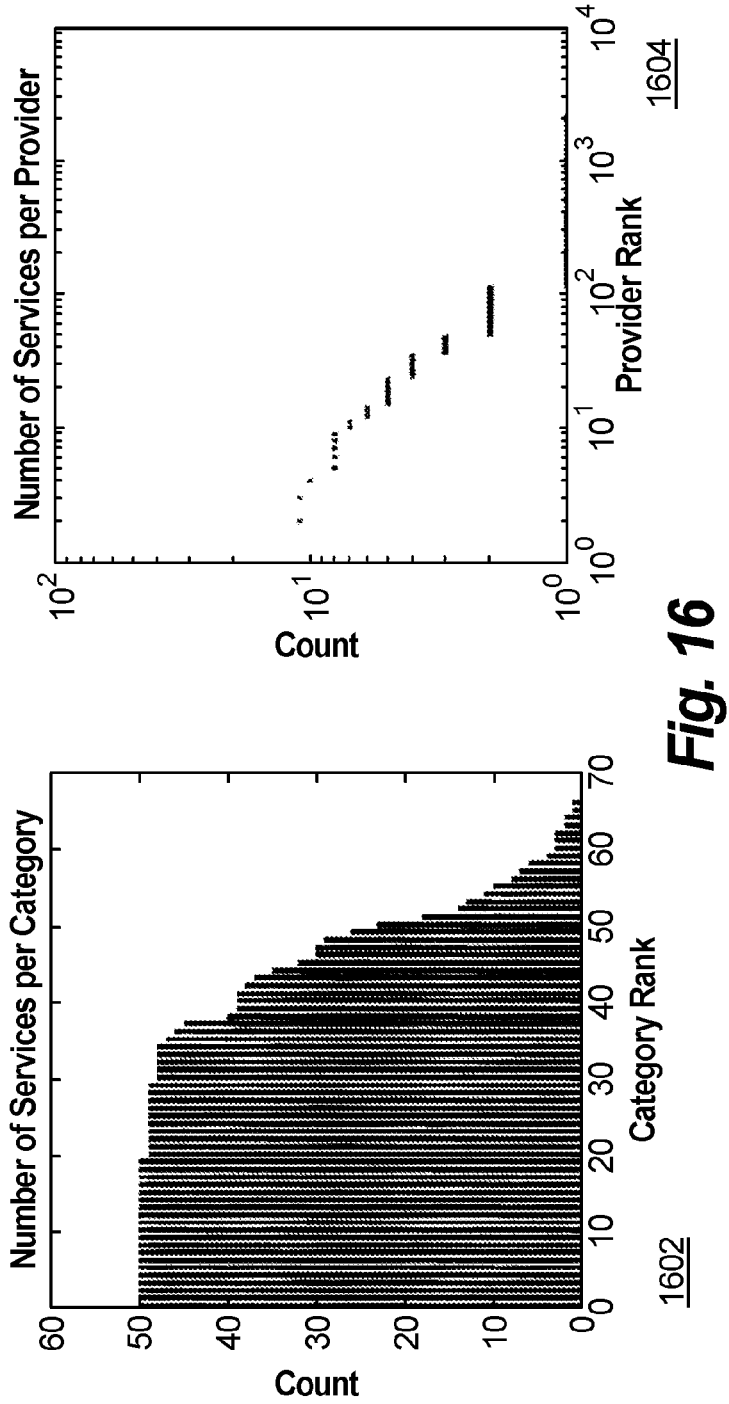
FIG. 15 shows top service categories and vendors.
FIG. 16 shows distributions about knowledge in a Services Knowledge Base (SKB), in accordance with aspects of the invention.

In some instances, the whole SKB can be put into one storage machine. In other embodiments, distributed knowledge base can be used to store more knowledge. Based on the statistics, in a non-limiting example, SKB contains sixty-seven distinct service categories and two thousand four hundred eleven services in total. These services are provided by two thousand one hundred fifteen service vendors. Moreover, fourteen thousand six hundred forty three distinct service capabilities are used to describe these services. The statistics shows that current SKB covers a wide range of areas and a large number of services. To drill down into the details, FIG. 16 shows two statistical measures regarding SKB. First, at 1602, group the services by their categories, and rank the categories by their counts in descending order. Some of the top categories are listed at 1502 in FIG. 15. As is shown, most of categories contain more than thirty services. Due to the complexity of service profile, the large number of services in each service category makes the attempt to find the proper service by searching the category difficult. Moreover, if each service is classified into multiple categories via fuzzy classification, or if the customer cannot adequately describe what category of service the customer is interested in, the difficulty of locating the proper service by browsing in a category is further increased. A log-log plot obtained by grouping services via their vendors is shown at 1604 in FIG. 16, and the number of services for five top vendors is shown at 1504 in FIG. 15. Note that only a very small portion of vendors (less than 5%) provide more than five services, and more than 90% of vendors only provide one or two services. This is a typical Zipfian distribution and it makes search-by-vendor efficient. However, in reality, the customer would either directly search the name of the service or search a proper service by providing the requirements. Searching a service via the vendor's name is not typical.

A non-limiting exemplary simulation of customer interaction with an exemplary embodiment of a CSM will now be described. As previously mentioned, in one or more embodiments, the customer only needs to give the CSM a brief description of what the customer needs, and then the CSM guides the conversation by prompting the customer with heuristic questions. Since all the conversation is in natural language, there is no particular training needed for customers. In one or more embodiments, the user interface is friendly enough for anyone to use it without reading a manual.

In the exemplary simulation, an attempt was made to try to find five proper services that satisfied requirements of a hypothetical customer. Interaction with CSM by deliberately entering something meaningless was also simulated. To focus on the service retrieval evaluation, requirements were restricted so that there were satisfied services in SKB. In a non-limiting example, the following services match the requirements:

IBM SMARTCLOUD ENTERPRISE PLUS,
ADP Payroll Mid-Sized Service,
GREENGOOSE ad-hoc mobile game platform,
IBM SMARTCLOUD managed backup service, and
SCHED* social network based event organizer The table of FIG. 17 lists the sample customer inputs and the related results about CSM's responses, including the number of identified categories (# Category Candidates), the number of service candidates initially found (# Service Candidates), the number of iterations for service filtering (# Iterations), and the average response time (AVG RESP Time).

Based on the identified candidates in the category, it was found that an embodiment of CSM is able to capture the intention of customers based on their initial rough inquiry. This is due to the Tagging mechanism during knowledge base population. It was also found that there are two problems with the results: some things that seem irrelevant are listed, and the categories are unordered. This is because, for efficiency, the embodiments of CSM that was employed only conducts simple NLP for the input by extracting ALL nouns and/or verbs and returning ALL service categories with semantically related tags. This approach returns more than the expected number of service candidates and degrades precision. However, since the following conversation iterations would gradually increase precision (as will be shown below), this limitation is not of great concern.

Figure 18:
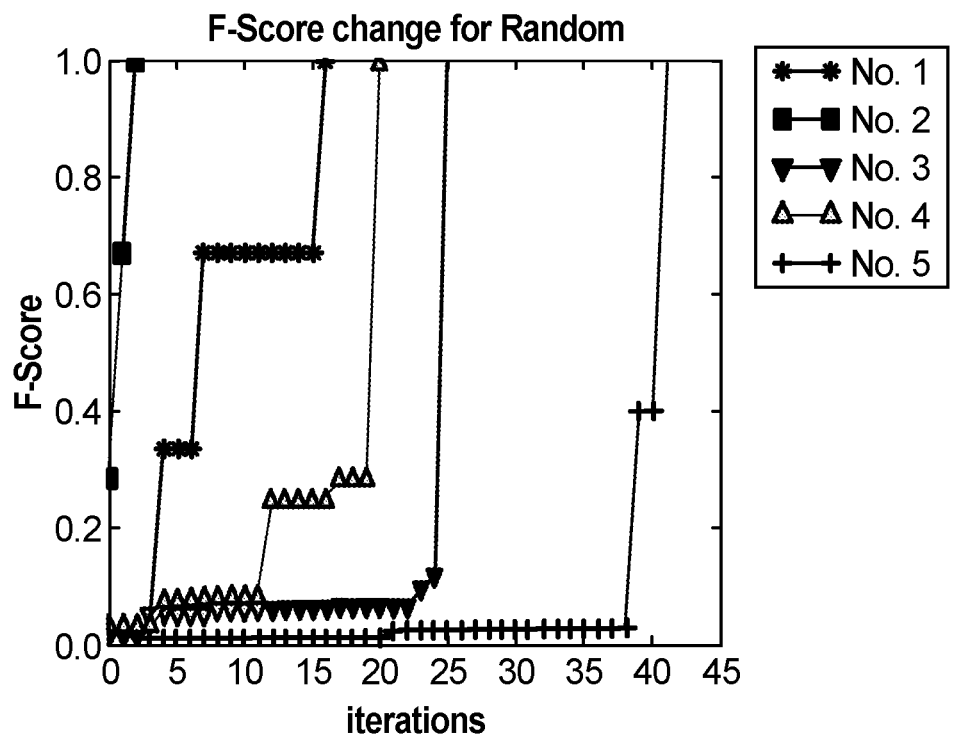
FIGS. 18-20 show iterative F-score for several different filtering methods, in accordance with aspects of the invention.
Figure 19:
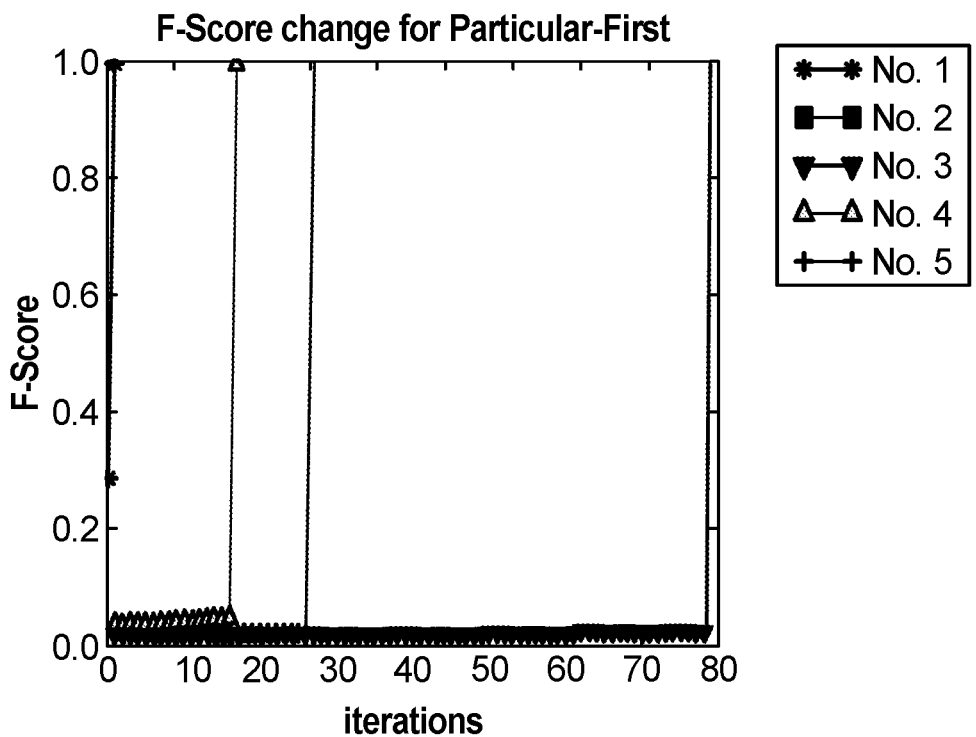
Figure 20:
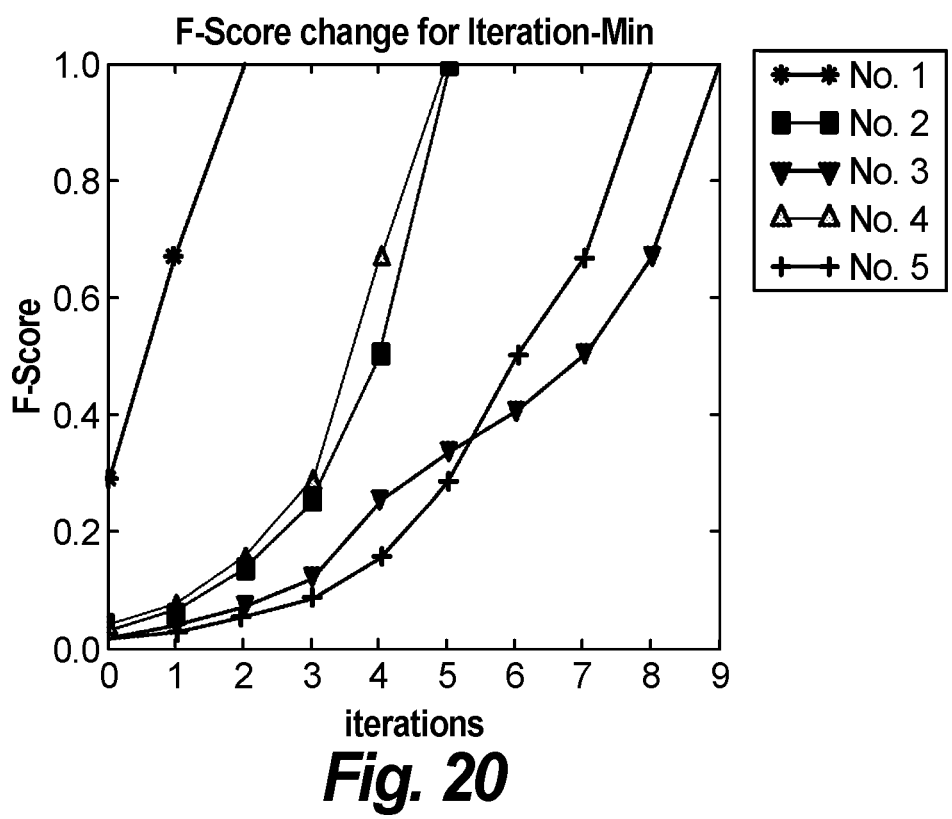

As noted, in one or more embodiments, CSM leverages an effectiveness model to minimize the number of conversation iterations. For comparison, two other filtering strategies were implemented, namely, RANDOM and PARTICULAR-FIRST. RANDOM, as per its name, randomly picks a capability and/or configuration as the filtering condition. PARTICULAR-FIRST picks the most particular capability and/or configuration (owned by the least number of candidates) as the filtering condition. The intuition is that once the customer confirms this capability and/or configuration, the search space can be significantly reduced. To quantitatively compare these methods, F-score was employed to evaluate their effectiveness. The methods were tried on all five of the valid query cases in FIG. 17, and then the corresponding F-score was recorded for each iteration. FIGS. 18-20 respectively show the iterative F-score for each filtering strategy. Since the dialogs would always lead to at least one matching service in SKB, the recall is always one. Also, the precision is very low at the beginning because CSM initially returns a large number of candidates. To mitigate the randomness of the RANDOM method, each query was run for five times and the one with the median of number of iterations was taken. From FIGS. 18-20 it can be seen that their behaviors are different in the following aspects:

Number of iterations. Among the three strategies, the number of iterations for ITERATION-MIN is far less than for the other two. Even for the case of one hundred ninety-one candidates, ITERATION-MIN can be finished in nine iterations, where the other two need forty-two and twenty-six iterations. This is because the question generated based on ITERATION-MN can always rule out approximately half of the candidates, despite of the decision of the customer.

Opportunism. PARTICULAR-FIRST is purely driven by opportunism. Once the correct capability and/or configuration is presented in question, the search space can be significantly reduced (F-score suddenly increases significantly). If the picked capability and/or configuration is unique, the proper service can be immediately located. Otherwise, only the candidates with particular capability and/or configuration would be pruned. This mechanism explains why in FIG. 19 the F-score only slightly increases for most of the time and then suddenly reaches the maximum at a certain time point. RANDOM also has the factor of opportunism. If a capability and/or configuration with high effectiveness score is picked by chance, F-score would significantly increase. ITERATION-MIN does not consider opportunism, so F-score increases smoothly.

Scalability. The number of iterations for RANDOM and PARTICULAR-FIRST increases almost linearly as the number of candidates increases, while that of ITERATION-MN increases in $\log_2 N$ speed. This is because the probability of picking the correct particular capability and/or configuration decreases proportionally as the number of candidates increases. It becomes more difficult for PARTICULAR-FIRST to pick an effective capability and/or configuration by luck. RANDOM also has difficulty in picking an effective question by chance. Different from the other two, ITERATION-MIN aims to find the capability and/or configuration that approximately halves the candidates, so the candidates can always reduce at logarithmic speed.

The experimental results in the non-limiting example above demonstrate the advantages of ITERATION-MIN during candidates filtering. Although PARTICULAR-FIRST requires fewer iterations by chance (query number one only needs one iteration), it performs worse than ITERATION-MIN on average. Since customers may be likely to always remember a bad experience, it is believed to be preferable to use the better-on-average approach.

It is worth noting that one or more embodiments of CSM differ from the prior art in one or more of the following aspects:

(1) The Services Knowledge Base 408 stores more than services meta-data. In one or more embodiments, it is also used to store other types of information such as customers' profiles, service reviews, and the like. Therefore, the ontology in accordance with one or more embodiments describes broader concepts than the service itself.

(2) Instead of providing a simple catalog for service search, one or more embodiments of CSM use a conversational interface for service retrieval; a more natural way for customers to search and configure services.

It is worth noting that, while there is currently no "perfect" method to fully capture the user's intention from the user's input, feedback is an effective way to locate the resource or knowledge the user really wants.

Thus, one or more embodiments provide a Cloud Services Marketplace (CSM), an intelligent online marketplace specifically designed for cloud services. CSM is designed as an ecosystem to support complex services acquisition for services providers and customers. CSM enables the customers to communicate their requirements with the marketplace interface conversationally, via interface 416. The dialog engine 420 enables the system to gradually understand requirements and simultaneously filter and configure services. The back-end service ontology (see FIGS. 8 and 9 and discussion thereof) as well as the service knowledge base 408 enables the marketplace to identify a correct solution for the customer via semantic matching.

Given the discussion thus far, and referring again to FIG. 11, it will be appreciated that, in general terms, an exemplary method, according to an aspect of the invention, includes the step of obtaining from a user 1102, via a conversational interface 416, a natural language specification of at least one high level (also referred to herein interchangeably as "partial") information technology services requirement. A further step includes parsing the natural language specification of the at least one high level information technology services requirement into first pre-defined semi-structured data, using a conversation parser 418. Furthermore, based on the first pre-defined semi-structured data, additional steps include identifying, with a dialog engine 420, a subset of candidate information technology services from a plurality of candidate information technology services provided by a plurality of vendors; and formulating, with the dialog engine, a response comprising second pre-defined semi-structured data. A still further step includes reverse parsing the response comprising second pre-defined semi-structured data into a natural language response, using the conversation parser 418. The natural language response includes a question for the user 1102 to assist in further refining the subset of candidate information technology services. An even further step includes causing the natural language response to be presented to the user 1102 via the conversational interface 416.

Optionally, the identified subset of services is displayed as at 504 above.

In one or more embodiments, further iterations are carried out to pick one or more appropriate services. Thus, in one or more embodiments, additional steps include obtaining from the user 1102, via the conversational interface 416, a natural language input responsive to the natural language response; and parsing the natural language input into third pre-defined semi-structured data, using the conversation parser 418. Based on the third pre-defined semi-structured data, additional steps include filtering the subset of candidate information technology services from the plurality of candidate information technology services provided by a plurality of vendors; and configuring at least one candidate information technology service of the further filtered subset of candidate information technology services to meet the specification of the user (broadly understood to include the initial specification and optionally also subsequent user inputs). Refer to the discussion of FIGS. 6 and 7 above.

Note that in a non-limiting example, the semi-structured data is in JSON format, and it is used for message transmission. In some instances, it is helpful to pre-define several keys indicating the information that needs to be transmitted. Furthermore, in one or more embodiments, the flow back and forth between parser 418 and engine 420 is in a common format (semi-structured data) but each individual communication (requirement/response) will be different as the conversation progresses.

Filtering can be carried out, for example, by dialog engine 420, optionally with use of knowledge base 408 and query engine 410. Configuring can be carried out, for example, by dialog engine 420, optionally with use of service configurator 412.

In some cases, the filtering and configuring are carried out simultaneously, as explained in connection with steps 1204, 1240, 1238 in FIG. 12; in other instances, filtering and configuring are carried out sequentially.

In a non-limiting example, iteration-min filtering is employed.

In some cases, the identifying includes semantically querying a service knowledge base 408 with a semantic query engine 410.

Some embodiments further include building the service knowledge base 408 by extracting features from service descriptions in accordance with a schema of an ontology; using, for example, natural language understanding (NLU) software executing on one or more hardware processors. The skilled artisan will be familiar with NLU software per se, and, given the teachings herein, will be able to use same to implement one or more embodiments of the invention.

The service descriptions can be obtained, for example, via a crawler 425 and/or via a service provider registration interface 422. In some instances, crawler 425 is programmed to begin by crawling the web sites of service aggregators such as Apigee Corporation, Palo Alto, Calif., USA and PROGRAMMABLEWEB division of MuleSoft, San Francisco, Calif., USA; and then, if necessary, to crawl the web sites of actual service providers. Web crawling in and of itself is well-known; given the teachings herein, the skilled artisan will be able to program a web crawler for desired functionality.

In some cases, the parsing includes extracting at least one verb and/or at least one noun from at least one sentence of the natural language specification; removing stop words from the extracted at least one verb and at least one noun; dividing words remaining after the removing into include and exclude sets; propagating the include and exclude sets; and finding at least one of a corresponding category and a corresponding capability by tag annotating the include and exclude sets.

As noted elsewhere herein, in some cases, a further step includes providing a system, wherein the system includes distinct software modules. Each of the distinct software modules is embodied on a computer-readable storage medium. The distinct software modules include a conversational interface module, a conversation parser module, and a dialog engine module.

In another aspect, an exemplary system includes a memory (e.g., 30); at least one processor 16, coupled to the memory; and a computer-readable storage medium (e.g., as described in connection with element 28), a plurality of distinct software modules 42 are embodied on the computer-readable storage medium. The distinct software modules are loadable into the memory for execution by the processor. The distinct software modules include a conversational interface module, a conversation parser module, and a dialog engine module. The at least one processor is operative to create a conversational interface 416 by executing the conversational interface module, create a conversation parser 418 by executing the conversation parser module, and create a dialog engine 420 by executing the dialog engine module, and optionally any of the other modules and/or sub-modules described herein, which are then operable to carry out any one, some, or all of the method steps as described herein.

Exemplary System and Article of Manufacture Details

As will be appreciated by one skilled in the art, aspects of the present invention may be embodied as a system, method or computer program product. Accordingly, aspects of the present invention may take the form of an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the most general case, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). One or more embodiments are particularly significant in the context of a cloud or virtual machine environment. Reference is made back to FIGS. 1-3 and accompanying text.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks 42 in FIGS. 3, 4, 8, 9, 11, and 12 and/or modules and/or submodules tom implement the query in FIG. 10 and the algorithms in FIGS. 13 and 14. The method steps can then be carried out using the distinct software modules and/or sub-modules of the system, as described above, executing on one or more hardware processors such as 16. Sub-modules may be referred to in the claims simply as modules in some cases. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining from a user, via a conversational interface, a natural language specification of at least one high level information technology services requirement;
   parsing said natural language specification of said at least one high level information technology services requirement into first pre-defined semi-structured data, using a conversation parser;
   based on said first pre-defined semi-structured data:
      identifying, with a dialog engine, a subset of candidate information technology services from a plurality of candidate information technology services provided by a plurality of vendors; and
      formulating, with said dialog engine, a response comprising second pre-defined semi-structured data;
   reverse parsing said response comprising said second pre-defined semi-structured data into a natural language response, using said conversation parser, said natural language response comprising a question for said user to assist in further refining said subset of candidate information technology services; and
   causing said natural language response to be presented to said user via said conversational interface.

2. The method of claim 1, further comprising:
   obtaining from said user, via said conversational interface, a natural language input responsive to said natural language response;
   parsing said natural language input into third pre-defined semi-structured data, using said conversation parser;
   based on said third pre-defined semi-structured data:
      filtering said subset of candidate information technology services from said plurality of candidate information technology services provided by a plurality of vendors; and
      configuring at least one candidate information technology service of said further filtered subset of candidate information technology services to meet said specification of said user.

3. The method of claim 2, wherein said filtering and said configuring are carried out simultaneously.

4. The method of claim 2, wherein said filtering comprises iteration-min filtering.

5. The method of claim 4, wherein said identifying comprises semantically querying a service knowledge base with a semantic query engine.

6. The method of claim 5, further comprising building said service knowledge base by extracting features from service descriptions in accordance with a schema of an ontology.

7. The method of claim 6, further comprising obtaining said service descriptions via a crawler.

8. The method of claim 6, further comprising obtaining said service descriptions via a service provider registration interface.

9. The method of claim 1, wherein said parsing comprises:
   extracting at least one of a verb and a noun from at least one sentence of said natural language specification;
   removing stop words from said extracted at least one of a verb and a noun;
   dividing words remaining after said removing into include and exclude sets;
   propagating said include and exclude sets; and
   finding at least one of a corresponding category and a corresponding capability by tag annotating said include and exclude sets.

10. The method of claim 1, further comprising providing a system, wherein the system comprises distinct software modules, each of the distinct software modules being embodied on a computer-readable storage medium, and wherein the distinct software modules comprise a conversational interface module, a conversation parser module, and a dialog engine module;
   wherein:
      said obtaining and said causing are carried out by said conversational interface module executing on at least one hardware processor, said conversational interface module executing on said at least one hardware processor comprising said conversational interface;
      said parsing and said reverse parsing are carried out by said conversation parser module executing on said at least one hardware processor, said conversation parser module executing on said at least one hardware processor comprising said conversation parser; and
      said identifying and formulating are carried out by said dialog engine module executing on said at least one hardware processor, said dialog engine module executing on said at least one hardware processor comprising said dialog engine.

11. A computer program product comprising a non-transitory computer readable storage medium having computer readable program code embodied therewith, said computer readable program code comprising:
   computer readable program code configured to obtain from a user a natural language specification of at least one high level information technology services requirement;
   computer readable program code configured to parse said natural language specification of said at least one high level information technology services requirement into first pre-defined semi-structured data;
   computer readable program code configured to, based on said first pre-defined semi-structured data:
      identify a subset of candidate information technology services from a plurality of candidate information technology services provided by a plurality of vendors; and
      formulate a response comprising second pre-defined semi-structured data;
   computer readable program code configured to reverse parse said response comprising said second pre-defined semi-structured data into a natural language response, said natural language response comprising a question for said user to assist in further refining said subset of candidate information technology services; and
   computer readable program code configured to cause said natural language response to be presented to said user.

12. A system comprising:
   a memory;
   at least one processor, coupled to said memory; and
   a non-transitory computer-readable storage medium, a plurality of distinct software modules being embodied on said non-transitory computer-readable medium, said distinct software modules being loadable into said memory for execution by said processor, said distinct software modules comprising a conversational interface module, a conversation parser module, and a dialog engine module;
   wherein said at least one processor is operative to:
      create a conversational interface by executing said conversational interface module, said conversational interface obtaining from a user a natural language specification of at least one high level information technology services requirement;
      create a conversation parser by executing said conversation parser module, said conversation parser parsing said natural language specification of said at least one high level information technology services requirement into first pre-defined semi-structured data;
      create a dialog engine by executing said dialog engine module, said dialog engine, based on said first pre-defined semi-structured data:
         identifying a subset of candidate information technology services from a plurality of candidate information technology services provided by a plurality of vendors; and
         formulating a response comprising second pre-defined semi-structured data;
   wherein:
      said conversation parser reverse parses said response comprising said second pre-defined semi-structured data into a natural language response, said natural language response comprising a question for said user to assist in further refining said subset of candidate information technology services; and
      said conversational interface causes said natural language response to be presented to said user.

13. The system of claim 12, wherein:
   said conversational interface obtains from said user a natural language input responsive to said natural language response;
   said conversation parser parses said natural language input into third pre-defined semi-structured data;
   said at least one processor is further operative to, based on said third pre-defined semi-structured data:
      filter said subset of candidate information technology services from said plurality of candidate information technology services provided by a plurality of vendors; and
      configure at least one candidate information technology service of said further filtered subset of candidate information technology services to meet said specification of said user.

14. The system of claim 13, wherein said at least one processor is further operative to carry out said filtering and said configuring simultaneously.

15. The system of claim 13, wherein said at least one processor is operative to filter via iteration-min filtering.

16. The system of claim 15, wherein said at least one processor is operative to identify by semantically querying a service knowledge base with a semantic query engine.

17. The system of claim 16, wherein said at least one processor is further operative to build said service knowledge base by extracting features from service descriptions in accordance with a schema of an ontology.

18. The system of claim 17, wherein said at least one processor is further operative to obtain said service descriptions via a crawler.

19. The system of claim 17, wherein said at least one processor is further operative to obtain said service descriptions via a service provider registration interface.

20. The system of claim 12, wherein said at least one processor is operative to parse by:
   extracting at least one of a verb and a noun from at least one sentence of said natural language specification;
   removing stop words from said extracted at least one verb and at least one noun;
   dividing words remaining after said removing into include and exclude sets;
   propagating said include and exclude sets; and
   finding at least one of a corresponding category and a corresponding capability by tag annotating said include and exclude sets.

* * * * *